United States Patent [19]
Hansen et al.

[11] Patent Number: 5,767,669
[45] Date of Patent: Jun. 16, 1998

[54] MAGNETIC FIELD POSITION AND ORIENTATION MEASUREMENT SYSTEM WITH DYNAMIC EDDY CURRENT REJECTION

[75] Inventors: Per Krogh Hansen; Westley S. Ashe, both of Burlington, Vt.

[73] Assignee: Ascension Technology Corporation, Vt.

[21] Appl. No.: 663,774

[22] Filed: Jun. 14, 1996

[51] Int. Cl.[6] .................. G01B 7/14; G01B 7/30; G01R 33/02; G01R 33/025

[52] U.S. Cl. .................. 324/207.12; 324/207.17; 324/225; 324/247; 342/450; 364/559

[58] Field of Search .................. 324/207.12, 207.17, 324/207.26, 225, 239, 243, 249, 326, 329; 342/450, 451, 453; 340/870.31; 364/559, 449.1

[56] References Cited

U.S. PATENT DOCUMENTS

| | | | |
|---|---|---|---|
| 4,394,831 | 7/1983 | Egli et al. | 324/225 X |
| 4,945,305 | 7/1990 | Blood | 324/207.17 |
| 5,453,686 | 9/1995 | Anderson | 324/207.17 |

*Primary Examiner*—Gerard R. Strecker
*Attorney, Agent, or Firm*—H. Jay Spiegel

[57] ABSTRACT

The position and orientation of remote sensors is determined using pulsed magnetic fields generated from a fixed location. Pulsed magnetic fields are sequentially generated from a plurality of spatially independent components defining a source coordinate frame. The pulsed magnetic fields are sensed by a remote sensor having a plurality of passive field sensing elements. Eddy current distortions are sensed separately and subtracted by the system. The system measures the effect of metallic objects present in the environment and dynamically adjusts the measured values accordingly. The sensed magnetic fields, free of eddy current distortion, are used in order to calculate the position and orientation of the remote object. The system shortens the duration of pulsed magnetic fields and operates correctly at much further distances for the same energy output as compared to known systems.

50 Claims, 13 Drawing Sheets

FIG. 3
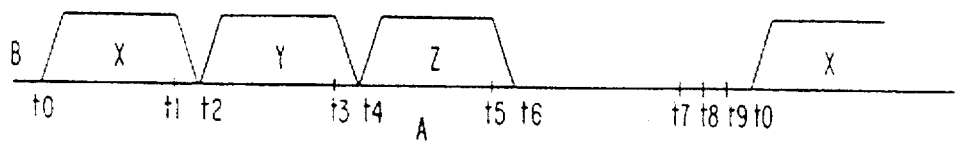
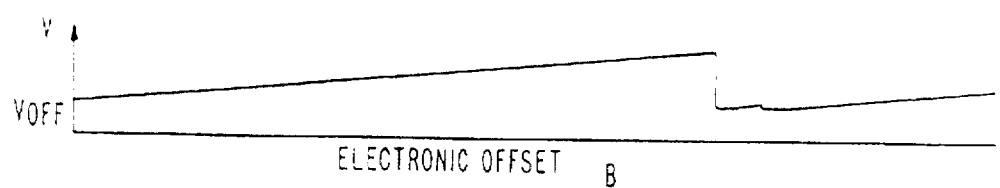
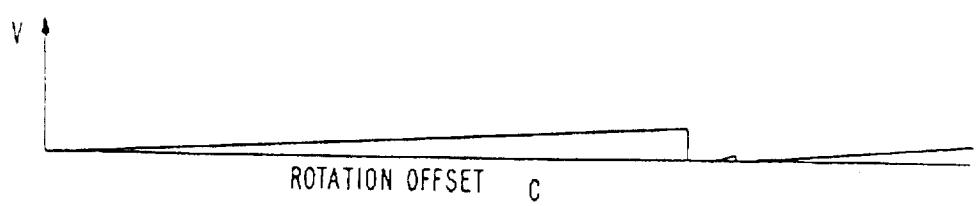
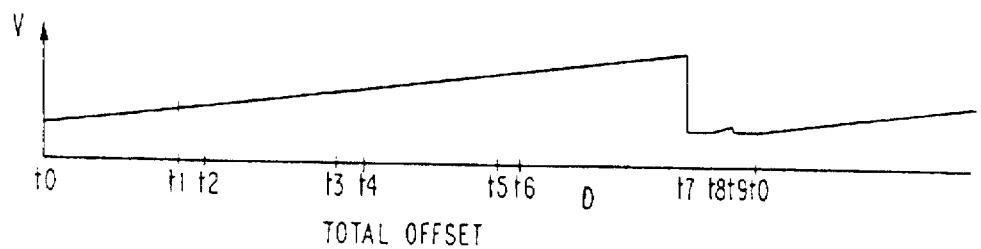

MAGNETIC FIELD POSITION AND ORIENTATION MEASUREMENT SYSTEM WITH DYNAMIC EDDY CURRENT REJECTION

BACKGROUND OF THE INVENTION

The present invention relates to a magnetic field position and orientation measurement system with dynamic eddy current rejection. In the prior art, the use of magnetic fields to measure position and orientation of an object within a defined space are known. In such known systems, it has been recognized that eddy currents result from the emanation of magnetic fields in areas where metallic materials are present. In attempting to compensate for the presence of such metallic materials and the resultant formation of eddy currents, experiments have been performed to determine the typical durations of eddy currents. Such experiments have led to the conclusion that emanation of magnetic fields adjacent particular metallic materials results in formation of eddy currents of predictable duration. However, to Applicant's knowledge, no system has been devised that will dynamically compensate for such eddy current formation. If one does not compensate for the formation of eddy currents, measurements made through the controlled use of magnetic fields have an unacceptable degree of error. It is with these problems in mind that the present invention was developed.

The following prior art is known to Applicant:

In U.S. Pat. Nos. 4,849,692 and 4,945,305 to Ernest B. Blood, a remote object's position and orientation are determined. The system disclosed in these patents utilizes a plurality of pulsed DC magnetic fields with long, fixed length, steady state components. The steady state component of each of the generated magnetic fields is measured by DC-field-sensitive sensors. The system deals with the field distortions resulting from the decay of eddy currents induced in electrically conductive materials from the generated magnetic fields by waiting a long enough time for the eddy currents to decay substantially, before measuring the lengthy steady state component of the generated magnetic fields.

Blood teaches (1) the need for generating magnetic fields with a long, fixed length, steady state component, (2) the need for using a complex, bulky and expensive active DC-field-sensitive sensor, and (3) the need for compensation for the earth's magnetic field, by measuring it when no magnetic field is being generated. Blood does not measure the amount of metal present in the environment, but instead relies on the same length of the steady state magnetic field component regardless of which metal is present in the environment. No dynamic eddy current compensation is disclosed.

In U.S. Pat. No. 5,453,686 to Peter T. Anderson, a remote object's position and orientation are determined. The Anderson system utilizes a plurality of pulsed magnetic fields with long, fixed length, steady state components. The steady state component of each of the generated magnetic fields is measured by passive sensors. The system deals with the field distortions resulting from the decay of eddy currents induced in electrically conductive materials from magnetic fields by waiting a long enough time for the eddy currents to decay substantially, before measuring the steady state component of the generated magnetic fields.

Anderson teaches (1) the need for generating pulsed magnetic fields with a long, fixed length, steady state component, (2) the need for using a single coil with an integrator and a reset switch in order to sense the generated pulsed magnetic fields, and (3) the need for compensation for movements in the earth's magnetic field and offsets in the preamplifiers and integrators by measuring the sensors' output, while no magnetic field is being generated. Anderson does not determine the types of metals present in the environment, but must rely on the same length of the steady state component of each generated magnetic field regardless of what metal is present in the environment. No dynamic compensation for eddy currents is disclosed.

The papers "Time domain response of a sphere in the field of a coil: Theory and experiment", IEEE Transactions on Geoscience and Remote Sensing, Vol. GE-22, No. 4, July 1984, pp. 360–367, and "Determination of Depth of Shallowly Buried Objects by Electromagnetic Induction", IEEE Transactions on Geoscience and Remote Sensing, Vol. GE-23, No. 1, January 1985, by Yogadish Das et al. teach measurements of the decay of induced eddy currents in conductive permeable metals, where generated magnetic field pulses are employed. A magnetic pulse is generated and held until the eddy currents have died out. The pulse is then returned to zero and measurement of the eddy currents is started. The results show that it takes about two milliseconds for eddy currents to die out, when the material of a small sphere is aluminum. The papers do not teach how to compensate for eddy currents.

U.S. Pat. No. 5,015,945 to Arthur V. Radun teaches measurement of magnetic field pulses by the use of a coil followed by an integrator with a reset mechanism. The system measures the current in a semiconductor switch. Radun fails to teach how to compensate for eddy currents.

"Comparison of apparent resistivity functions for transient electromagnetic methods" by A. P. Raiche (Geophysics, Vol. 48, p. 787–789 by J. Manacnae et al.), Geophysics, Vol. 49, March 1984, pp. 312–313, teaches the use of a simple analog integrator on the output of a sensing coil as equivalent to using a SQUID magnetometer sensor for measurement of magnetic field pulses. Again, no eddy current compensation is taught.

"The development and applications of a wide band electromagnetic sounding system using pseudo-noise source", Geophysics, Vol. 45, Issue 8, August 1980, pp. 1276–1296, by P. M. Duncan et al., teaches that the use of flux gate magnetometer is equivalent to using a simple air core coil followed by an integrator. Again, no eddy current compensation is taught.

"An improved pulse transient airborne electromagnetic system for locating good conductors", Geophysics, Vol. 41, No. 2, April 1976, pp. 287–299, by D. Gupta Sarma et al., teaches the use of integrating circuits resulting in measurement of fields and not their time derivatives. Measurements are taken using half-sinousoidal, square or triangular waveforms. Measurement of a magnetic field is performed simply by integrating, with respect to time, the voltage picked up by the receiver coil, before sampling it. Sarma et al. fail to teach dynamic eddy current compensation.

The paper "A time-domain EM System Measuring the Step Response of the ground", Geophysics, Vol. 49, No. 7 (July 1984), p. 1010–1026 by G. F. West et al., utilizes triangular waveforms while measuring the step response of the ground. West et al. fail to teach dynamic eddy current compensation.

U.S. Pat. No. 3,707,672 to Robert C. Miller et al. teaches the use of two gated integrators to measure the slope of an eddy current in order to detect metallic weapons in a pulsed magnetic field. Miller et al. teach employing the existence of eddy currents to detect metals rather than compensating for the existence of eddy currents.

U.S. Pat. Nos. 5,047,718 to T. J. Kari et al. and 4,894,619 to Erkki I. Leinonen et al. teach the use of correlation of responses inside and outside a cut-off peak area for improved discrimination of an impulse technique metal detector. Again, eddy current compensation is not taught.

U.S. Pat. No. 4,470,015 to Richard E. Hirschi et al. teaches the discrimination between mineralized ground, ferrous metal and non-ferrous metal by the use of phase shifters and demodulators. U.S. Pat. Nos. 5,414,411 to William E. Lahr and 4,821,023 to Stephen I. Parks teach the use of coils and integrators in order to detect metals in pulse induction magnetic fields. None of these patents teaches dynamic eddy current compensation.

The present invention overcomes all of the drawbacks of the prior art systems by teaching a method to determine the position and orientation of an object without the need for generating magnetic fields with long, fixed length, steady state components and without the need for compensation measurements when no magnetic fields are being generated. The amount of metal in the environment is measured and eddy current distortion compensation is controlled dynamically using this information.

SUMMARY OF THE INVENTION

The present invention relates to embodiments of a magnetic field position and orientation measurement system with dynamic eddy current rejection. The present invention includes methods and apparatuses for determining the position and orientation of a remote object relative to a fixed source. In each embodiment, the source consists of a plurality of fixed field generating coils that are sequentially operated to provide sequential pulsed magnetic fields. In each embodiment, the sensor consists of a plurality of passive sensing coils mounted in fixed relation to one another on a remote unit and movable within a prescribed area. These coils are capable of measuring the rate-of-change of the magnetic fields generated by the source coils. In each embodiment, to compensate for eddy current distortion, the magnetic field induced by the eddy currents is sensed and the durations of the pulses of magnetic fields from the source coils are dynamically adjusted as to duration in response to sensing of eddy current distortion and/or particular metals within the adjacent environment. A processor receives signals responsive to the sensed fields and calculates position and orientation coordinates for the remote unit.

In an important aspect, in the embodiments of the present invention, the passive sensing coils that are employed are only responsive to the rate-of-change of generated magnetic fields. As such, static fields such as the earth's magnetic field are not sensed. Accordingly, the present invention does not include any circuitry for compensation for the earth's magnetic field since such compensation is not necessary. Additionally, as should be understood, the embodiments of the present invention are not sensitive to the static magnetic field generated from ferrous magnetic materials.

The present invention includes the following interrelated objects, aspects and features:

(1) A first embodiment of the present invention teaches real time detection of the point in time, when eddy currents have died out and the decay time. Magnetic field pulses are generated from the source coils with steady state components, the lengths of which are controlled by the detection of the eddy current decay time. An integrator integrates the output of each sensor coil. Eddy current distortion is eliminated, since the measurements are made after the eddy current distortion has died out. The length of the steady state component of the generated magnetic fields is dynamically adjusted depending upon the metallic materials in the adjacent environment. This further provides feedback for the user about the metallic distortion and the fastest update rate possible for the measurements.

(2) The second embodiment of the invention teaches the use of a first signal integrator adapted to integrate the output of the passive sensor coil over a given time while the magnetic field is being generated, shifting from zero to its steady state level. The resulting signal is the sum of both the generated magnetic field and the induced eddy current distortion. This embodiment uses at least one second signal integrator adapted to integrate the output of the passive sensor coil over a given time, while the generated magnetic field is not changing (during its steady state only). The resulting signal consists only of the eddy current distortion. The system only needs to measure the eddy current decay for a brief moment, since it also measures when the eddy currents have died out and the decay time. It is therefore possible to calculate the total eddy current, thereby allowing operation with very short steady state components and therefore much lower power requirements to drive the source coils. Alternatively, the same power level may be employed with short, higher intensity pulses to increase range. The processor subtracts the eddy current field distortion from the signal consisting of the sum of both the generated magnetic field and the eddy current distortion and uses these corrected components to calculate the remote object's position and orientation.

(3) The third embodiment of the present invention teaches a system that utilizes generation of the magnetic fields with no steady state component necessary. It utilizes two integrators in parallel for each channel. The generated magnetic field can be in the form of a triangular, a square wave, a half-sinousoidal or any other shaped pulse. The first integrator integrates from the start of the pulse until it has reached its peak. The second integrator, the metal detector, integrates through the whole generated pulse, resulting in a signal proportional solely to the eddy current distortion. The corrected eddy current distortion is found and the processor subtracts the eddy current field distortion from the signal consisting of the sum of both the generated magnetic field and the eddy current distortion and uses these corrected components to calculate the remote object's position and orientation. This embodiment allows for much lower power requirements or, alternatively, operation at much further distances.

(4) The fourth embodiment of the present invention teaches a system that also utilizes generation of the magnetic fields with no steady state component necessary. It utilizes two integrators in series for each channel. The generated magnetic field can be a triangular, a square wave, a half-sinousoidal or any other shaped pulse. The first integrator integrates from the start of the pulse, until the eddy current distortion has died out. The second integrator integrates the output of the first integrator for the same time period. The output of the second integrator is proportional to only the integration of the generated pulse. No need for eddy current distortion compensation is therefore necessary. This embodiment requires much lower power or may operate at much further distances.

(5) The fifth embodiment of the present invention teaches a system that utilizes generation of the magnetic fields with only a brief steady state component or no steady state component necessary. The embodiment utilizes two sample-and-hold circuits in parallel for each channel. The first sample-and-hold circuit measures the output of the sensor coil just before it has reached the steady state. The second sample-and-hold circuit, the metal detector, measures the output of the coil at the end of the steady state or just after the source coil pulse starts to return to zero, which is only proportional to the time derivative of the eddy current distortion only. The processor subtracts the time derivative of the eddy current field distortion from the signal consisting of the time derivative of the sum of both the generated magnetic field and the eddy current distortion. The correct received magnetic field is found and these corrected components are used to calculate the remote object's position and orientation. This embodiment requires much lower power or may operate at much further distances.

(6) The sixth embodiment of the present invention teaches a system that utilizes generation of the magnetic fields with no steady state component necessary. The need to wait for the eddy current distortion to die out, before the next source coil is turned on is eliminated. This embodiment utilizes two integrators in parallel for each channel. The generated magnetic field can be a triangular, a square wave, a half-sinousoidal or any other shaped pulse. The first integrator integrates from the start of the pulse until it has reached its peak. The second integrator, the metal detector, integrates through the whole pulse, which is proportional to the eddy current only. The corrected eddy current distortion is thus found. The processor subtracts the eddy current field distortion from the signal consisting of the sum of both the generated magnetic field and the eddy current distortion and uses these corrected components to calculate the remote object's position and orientation. Low power operation may be achieved. This embodiment allows for a faster update rate of the measurements and for operation at much further distances.

The present invention achieves all the advantages of the Blood device and all the advantages of the Anderson device while avoiding their deficiencies. The present invention eliminates the field distorting effect of eddy currents resulting from electrically conductive materials in the vicinity of the system. It further eliminates the need for long, fixed length, steady state components of the generated pulsed magnetic field. Through use of the present invention, it is no longer necessary to wait long enough for the lengthiest possible eddy currents to have died out before sensing the magnetic field. It yet further allows for lower power requirements for the source or operation at further distances. Given the shorter pulse times, it also allows for faster update rates of the measurements and allows for more effective reduction of outside electronic noise sources. The present invention further eliminates the need for measurements when no pulsed magnetic fields are being generated in order to compensate for the earth's magnetic field and/or electronic offsets. The system measures the effects of metallic objects present in the adjacent environment and adjusts the system accordingly.

Accordingly, it is a first object of the present invention to provide a magnetic field position and orientation measurement system with dynamic eddy current rejection.

It is a further object of the present invention to provide such a system that detects the point in time when eddy currents have died out and accordingly adjusts the duration of source coil pulses.

It is a yet further object of the present invention to provide such a system wherein the slope of the decay of the eddy currents generated may be measured and compensation may be thereby provided.

It is a still further object of the present invention to provide such a system which may utilize generation of magnetic fields without a steady state component.

It is a still further object of the present invention to provide such a system including sample-and-hold circuitry to measure the output of the sensor coil just before it has reached the steady state to allow compensation for eddy currents.

It is a yet further object of the present invention to provide such a system incorporating a metal detector to detect the actual metals present in the adjacent environment and to permit compensation therefor.

These and other objects, aspects and features of the present invention will be better understood from the following detailed description of the preferred embodiments when read in conjunction with the appended drawing figures.

BRIEF DESCRIPTION OF THE DRAWINGS

FIG. 3 shows a timing diagram for electronic offset errors and errors due to rotation in the earth's magnetic field.

SPECIFIC DESCRIPTION OF THE PREFERRED EMBODIMENTS

Figure 1:
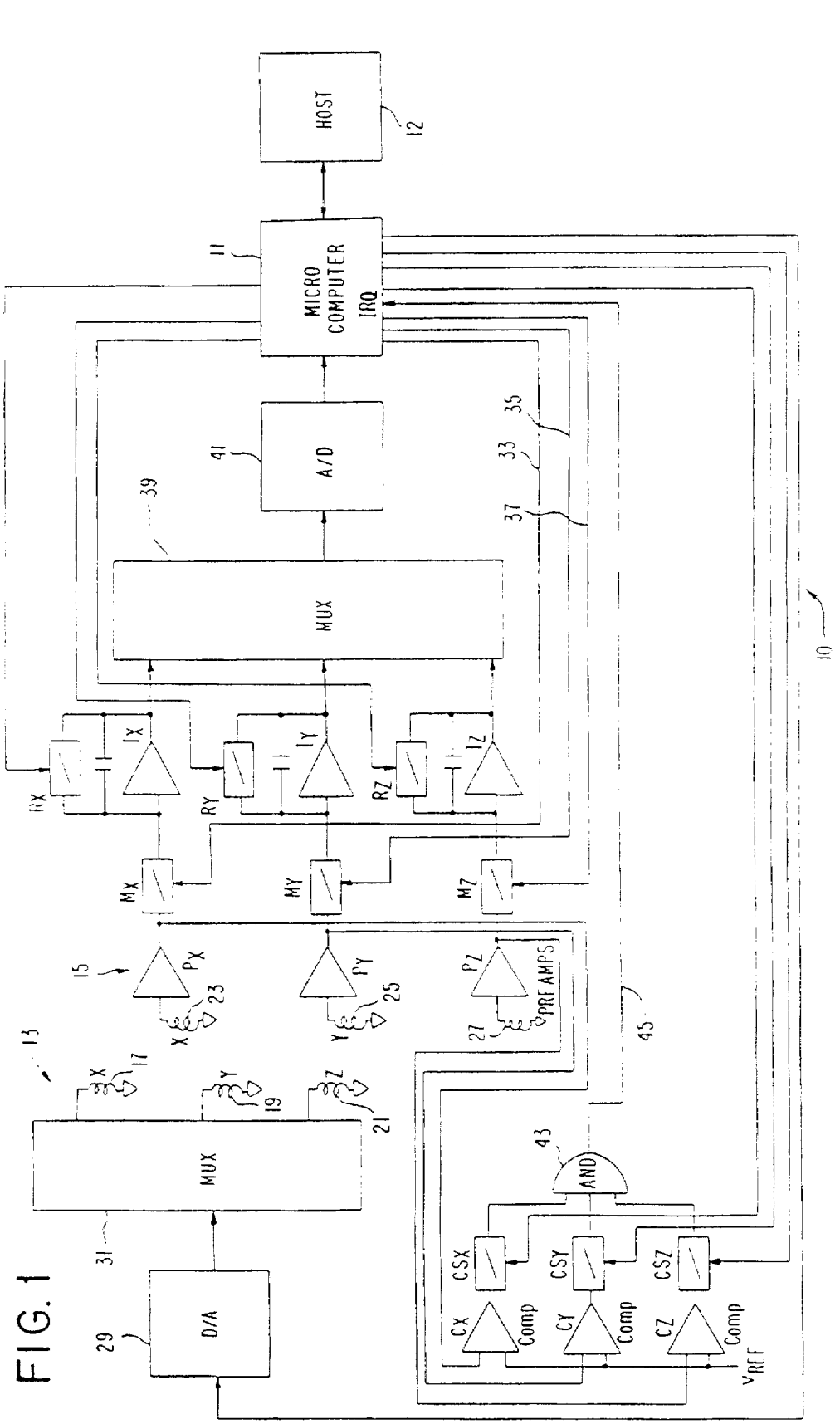
FIG. 1 shows a block diagram of the first embodiment of a position and orientation measurement system according to the present invention.
Figure 2:
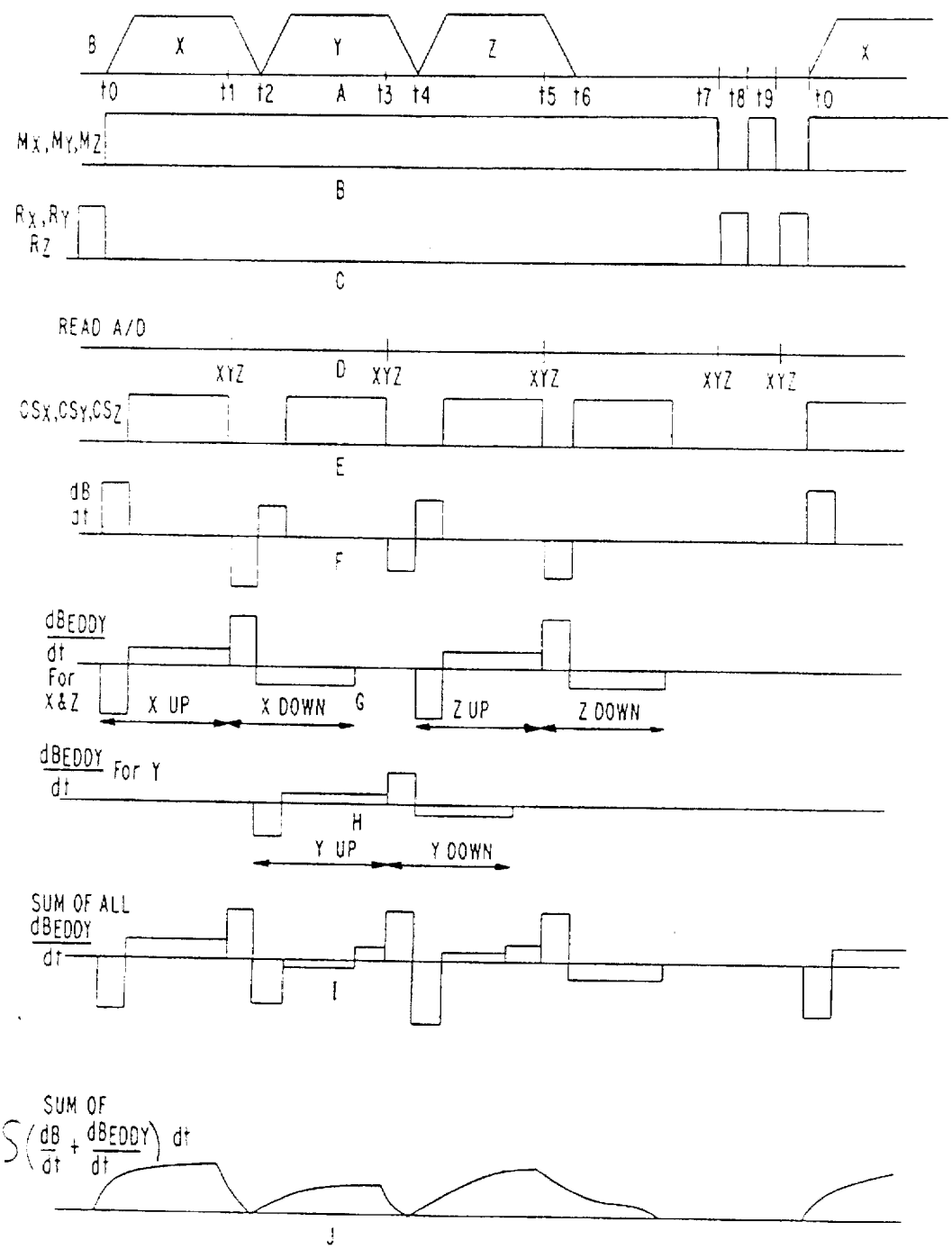
FIG. 2 shows a timing diagram for the system of FIG. 1.

With reference to FIGS. 1–3, a first embodiment of the present invention will be described in detail. The inventive system and a host computer 12 is generally designated by the reference numeral 10 and is seen to include a microcomputer 11 that controls operation of the system.

The FIG. 1 embodiment includes a fixed unit 13 and a remote unit 15. The fixed unit includes three mutually orthogonally directed magnetic field generating coils 17, 19 and 21 which are identified by the three-dimensional designations "X", "Y" and "Z", respectively. The remote unit includes three mutually orthogonally located passive sensor coils 23, 25 and 27 that are identified by the three-dimensional identifiers "X", "Y" and "Z", respectively.

As seen in FIG. 1, the microcomputer 11 controls operation of the source coils 17, 19 and 21 via driver means comprising a D/A converter 29 and a multiplexer 31 that is operated by the microcomputer 11 to sequentially pulse the respective coils 17, 19 and 21.

As also seen in FIG. 1, each of the sensor coils 23, 25 and 27 is followed by a preamplifier $P_X$, $P_Y$ and $P_Z$, respectively. Each preamplifier supplies a signal to a measure switch $M_X$, $M_Y$ and $M_Z$, respectively, the operation of which are controlled by the microcomputer 11 as shown with the control lines 33, 35 and 37, respectively.

When a measure switch M is closed, a signal is supplied to an integrator provided for each sensor 23, 25 and 27, with the integrators being respectively identified by the reference letters $I_X$, $I_Y$ and $I_Z$, respectively. Respective reset switches $R_X$, $R_Y$ and $R_Z$ are provided for each integrator to clear each integrator after an integration has been completed. Integrated signals from the integrators I are supplied to the microcomputer via a multiplexer 39 and an A/D converter 41. The multiplexer sequentially supplies the signals received from the coils 23, 25 and 27.

As further seen in FIG. 1, the system includes dynamic eddy current compensation means including an eddy current detector for each of the three channels. The eddy current detector comprises comparators $C_X$, $C_Y$ and $C_Z$, respectively, for each respective sensor 23, 25 and 27. Each comparator has one input that consists of a signal received from a respective preamplifier for a respective sensor coil 23, 25 or 27 and, as another input, $V_{REF}$, a reference voltage that is preset to a low value such that the output of the comparators will be high as long as the eddy current distortion is larger than $V_{REF}$. As seen, in FIG. 1, an AND gate 43 receives signals from the respective comparators via switches $CS_X$, $CS_Y$ and $CS_Z$ that are suitably controlled by the microcomputer 11. Thus, when the switch $CS_X$ is closed by the microcomputer 11, so long as the signal received by the comparator $C_X$ from the coil 23 is higher than $V_{REF}$, the comparator $C_X$ is "high" and this status is received by the AND gate 43. The same is true of the comparators $C_Y$ and $C_Z$. The conductor 45 connects the AND gate 43 with an interrupt circuit in the microcomputer 11. When the eddy current distortion of all of the sensor coils 23, 25 and 27, reduces to less than $V_{REF}$, the comparators $C_X$, $C_Y$ and $C_Z$ go to a "low" status and when this is sensed in the conductor 45, the interrupt circuit of the microcomputer is activated to deactivate the coil 17, 19 or 21.

In more detail as to the operation of the system of FIG. 1, reference is made to FIGS. 2 and 3 along with FIG. 1. Operation is started by generating a magnetic pulse from the X source coil 17. The magnetic field B generated by the coil 17 is sensed by the three sensor coils 23, 25 and 27 and, according to Faraday's Law of Induction, when each coil senses a changing magnetic field such as the field that occurs when the coil 17 is going from zero field to maximum field, a voltage is induced in the sensor coils 23, 25 and 27. As should be understood, since passive sensor coils are employed that only respond to changing magnetic fields, static magnetic fields such as the earth's magnetic field are not sensed. Since the earth's magnetic field does not induce any voltages in the sensor coils, no compensation is necessary for the presence of the earth's magnetic field.

The voltage induced over the sensor coils 23, 25 and 27 is proportional to the time derivative of the changing magnetic field as the field increases from zero to the maximum field based upon the applied power. The generated voltage is supplied to each respective integrator via the preamplifier $P_X$, $P_Y$ or $P_Z$ and via each measuring switch $M_X$, $M_Y$ and $M_Z$ as controlled by the microcomputer 11. When the induced voltage over the coil is integrated, the result is a voltage that is proportional to the generated magnetic field. However, if any metallic materials are in and/or adjacent to the space where measurements are being taken, the changing magnetic field induces eddy currents into such conductive metallic objects. These eddy currents generate a magnetic field that induces a voltage over a passive sensor coil proportional to the time derivative of the magnetic field. The magnetic field from the eddy currents is described herein as $B_{EDDY}$. Thus, the total induced voltage over each of the sensor coils 23, 25 or 27 is the sum of the voltage induced from the generated magnetic field from the source coils 17, 19 or 21 and the voltage induced from the eddy currents related to the eddy current magnetic field $B_{EDDY}$. As such, when metallic materials are in the space adjacent to where the measurements are taking place, when the total signal is integrated by the integrators $I_X$, $I_Y$ and $I_Z$, the resulting signal on the output of the integrator comprises a voltage directly proportional to the sum of the generated magnetic field B and the magnetic field generated by the eddy currents $B_{EDDY}$.

As explained above, the speed with which the eddy current decays is dependent upon the type of metallic material that is generating the eddy current. For example, studies have shown that the decay time where the material is a small aluminum sphere is approximately 2 milliseconds. Depending upon size and thickness, longer decay times will occur. Thus, if the adjacent metallic material is aluminum, if the system first measures the output of the integrators after this decay time, the system will simply only measure a signal proportional to the generated magnetic field from the source coils without the eddy current component. Thus, in such a scenario, the distortion resulting from the eddy current has been virtually eliminated. The prior art systems discussed above do not discriminate between eddy currents of varying decay times. Thus, in such systems, the steady state component of the magnetic field must be set to be at least as long as the worst case scenario for the longest possible decay time.

The embodiment shown in FIG. 1 overcomes this problem by measuring the eddy current distortion and dynamically adjusting the length of the steady state component in response to such measuring. Thus, where no metallic objects are present, much faster operation than that exhibited by the prior art may be accomplished. Where metallic objects are present, the steady state component of the field is only as long as necessary to allow the specific eddy current exhibited by the specific metallic objects present to appropriately decay. Through knowledge of the length of the time period for delay of the eddy current, one may discern the types of metallic objects that are present.

With particular reference to FIG. 2, the timing diagram shown should completely explain the operation of the circuit illustrated schematically in FIG. 1.

The timing diagram in FIG. 2 shows the timing of the generated magnetic fields, eddy current distortion and the operation of the switches and reading into the computer of the sensed signals. The time components of rising and falling energy of the generated pulses on the source coils are generally much shorter than the time component of steady state energy, but are not shown to scale in FIG. 2 for clarity purposes. The fall period and the rise period of two source coils can happen at the same time, but are shown here sequentially for clarity purposes. The eddy current distortions are generally much smaller than the induced voltages from the generated magnetic fields. The eddy current distortion is generally different for each of the sensor coils due to the position and orientation of the metallic object(s) with respect to the source coils. The measure switches $M_X$, $M_Y$ and $M_Z$ are closed just before the pulse is generated on the X source coil 17. The comparators measure the time derivative of the eddy currents' distortion on the three receiver coils 23, 25 and 27. The reference voltage on the comparators is preset to a low value. The comparator switches $CS_X$, $CS_Y$ and $CS_Z$ are closed just after the steady state component of the generated field is reached. The output of the comparators will be high as long as the eddy current distortion is larger (positive values) than the preset $V_{REF}$ value. When the eddy current distortion of all the sensor coils is less than the preset value, the computer 11 will be interrupted via the interrupt circuit to adjust and shorten the steady state time component of the magnetic field. The computer 11 controls the reading of the signals on the outputs of the integrators into the computer right after the interrupt, opening of the comparator switches and turning the signal on the X transmitter coil 17 off. Next, a pulse is generated on the Y source coil 19 and the cycle is repeated. Then a pulse is generated on the Z source coil 21 and the cycle is repeated again. After the pulse on the Z source coil has ended, the comparator switches $CS_X$, $CS_Y$ and $CS_Z$ are closed again. The output on the comparators will be high as long as the eddy current distortion is larger than the preset value. When the eddy current distortion on all the sensor coils is less than the preset value, the computer 11 will be interrupted. The computer controls the reading of the signals on the outputs of the integrators into the computer 11 right after the interrupt, opening of the comparator switches, opening the measure switches, and closing the reset switches for a brief moment in order for the integrators to reset. The measure switches are closed again and the output of the integrators, indicative of the fixed offset, are read into the computer. The measure switches are then opened again and the integrators are reset again. The output signals are corrected for integrator offsets and movements in the earth's magnetic field as described below. The system then calculates the position and orientation of the remote unit 15 and outputs this data to the host computer.

Electronic offset errors and the errors induced by rotations in the earth's magnetic field with respect to the sensor coils are shown in FIG. 3. The induced errors are shown simplified for constant speed rotations, while one measurement is being taken. The required compensation can be determined from the sampling times and the slopes of the errors. The preset reference voltage $V_{REF}$ on the comparators must be adjusted to include these offsets.

The following measurements are taken:

1) Integration of the X, Y, and Z sensor coil outputs from $t_o$ to t1, which are proportional to only the magnetic field generated by the X source coil, free of eddy current distortion.

$$V1 = \int_{t0}^{t1} \left( \frac{dB}{dt} + \frac{dB_{EDDY}}{dt} \right) dt + V_{OFF} + (t1 - t0)K$$

2) Integration of the X, Y, and Z sensor coil outputs from $t_o$ to t3, which are proportional to only the magnetic field generated by the Y source coil, free of eddy current distortion.

$$V2 = \int_{t0}^{t3} \left( \frac{dB}{dt} + \frac{dB_{EDDY}}{dt} \right) dt + V_{OFF} + (t3 - t0)K$$

3) Integration of the X, Y, and Z sensor coil outputs from $t_o$ to t5, which are proportional to only the magnetic field generated by the Z source coil, free of eddy current distortion.

$$V3 = \int_{t0}^{t5} \left( \frac{dB}{dt} + \frac{dB_{EDDY}}{dt} \right) dt + V_{OFF} + (t5 - t0)K$$

4) Integration of the X, Y, and Z sensor coil outputs from $t_o$ to t7, which are proportional to only offset errors as a function of time.
$V4 = V_{OFF} + K (t7-t0)$ 5) Integration of the X, Y, and Z sensor coil outputs from t8 to t9, which are proportional to only the fixed electronic offset error.
$V5 = V_{OFF}$ The error signal (V4–V5) is subtracted from the first three signals according to the sampling time and slope of the errors. These corrected values are used to calculate the remote object's position and orientation using an algorithm such as described in the Blood patents discussed above. This data is outputted to the host computer 12.

The computer 11 is programmed to utilize the measured eddy current decay time to advise the user on the host computer screen about this decay time, about what metallic objects are present and the maximum update rate with which the system can operate.

Figure 4:
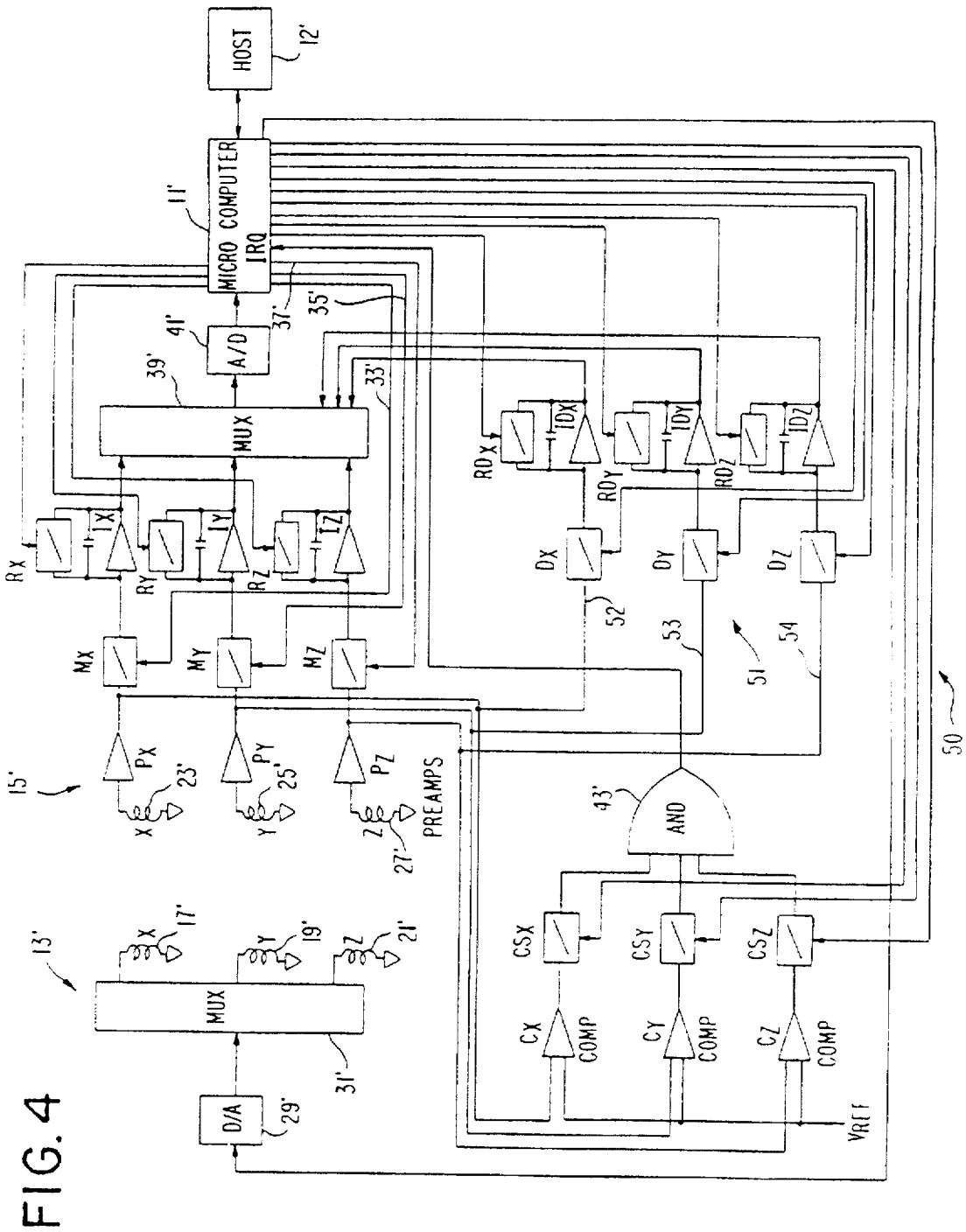
FIG. 4 shows a block diagram of the second embodiment of a position and orientation measurement system according to the present invention.

Reference is now made to a second embodiment of the present invention with a schematic representation of the electrical circuitry thereof being depicted in FIG. 4. Similar circuit elements in FIG. 4 as compared to FIG. 1 are depicted using like primed reference numerals and reference letters.

With reference to FIG. 4, the second embodiment of the present invention is generally designated by the reference numeral 50 and is seen to include a microcomputer 11' that controls operation of the system and a host computer 12'.

The second embodiment includes a fixed unit 13' and a remote unit 15'. The fixed unit includes three mutually orthogonally directed magnetic field generating coils 17', 19' and 21' identified by the three-dimensional designations "X", "Y" and "Z", respectively. The remote unit includes three mutually orthogonally located passive sensor coils 23', 25' and 27' that are identified by the three-dimensional identifiers "X", "Y" and "Z", respectively.

As seen in FIG. 4, the microcomputer 11' controls operation of the source coils 17', 19' and 21' via a D/A converter 29' and a multiplexer 31' that is operated by the microcomputer 11' to sequentially pulse the respective coils 17', 19' and 21'.

As also seen in FIG. 4, each of the sensor coils 23', 25'and 27' is followed by a preamplifier $P_X'$, $P_Y'$ and $P_Z'$, respectively. Each preamplifier supplies a signal to a measure switch $M_X'$, $M_Y'$ and $M_Z'$, respectively, the operation of which are controlled by the microcomputer 11' as shown with the control lines 33', 35' and 37', respectively.

When a measure switch M' is closed, a signal is supplied to an integrator provided for each sensor 23', 25' and 27', with the integrators being respectively identified by the reference letters $I_X'$, $I_Y'$ and $I_Z'$, respectively. Respective reset switches $R_X'$, $R_Y'$ and $R_Z'$ are provided for each integrator to clear each integrator after an integration has been completed.

Integrated signals from the integrators I' are supplied to the microcomputer 11' via a multiplexer 39' and an A/D converter 41'. The multiplexer sequentially supplies the signals received from the coils 23', 25' and 27'.

As further seen in FIG. 4, the system includes an eddy current detector for each of the three channels. The eddy current detector comprises comparators $C_X'$, $C_Y'$ and $C_Z'$, respectively, for each respective sensor 23', 25' and 27'. Each comparator has one input that consists of a signal received from a respective preamplifier for a respective sensor coil 23', 25' or 27' and, as another input, $V_{REF}$, a reference voltage that is preset to a low value such that the output of the comparators will be high as long as the eddy current distortion is larger than $V_{REF}$. As seen, in FIG. 4, an AND gate 43' receives signals from the respective comparators via switches $CS_X'$, $CS_Y'$ and $CS_Z'$ that are suitably controlled by the microcomputer 11'. Thus, when the switch $CS_X'$ is closed by the microcomputer 11', so long as the signal received by the comparator $C_X'0$ from the coil 23' is higher than $V_{REF}$, the comparator $C_X'$ is "high" and this status is received by the AND gate 43'. The same is true of the comparators $C_Y'$ and $C_Z'$. The conductor 45' connects the AND gate 43' with an interrupt circuit in the microcomputer 11'. When the eddy current distortion of all of the sensor coils 23', 25' and 27', reduces to less than $V_{REF}$, the comparators $C_X'$, $C_Y'$ and $C_Z'$ go to a "low" status and when this is sensed in the conductor 45', the interrupt circuit of the microcomputer is activated to deactivate the coil 17', 19' or 21'.

Figure 5:
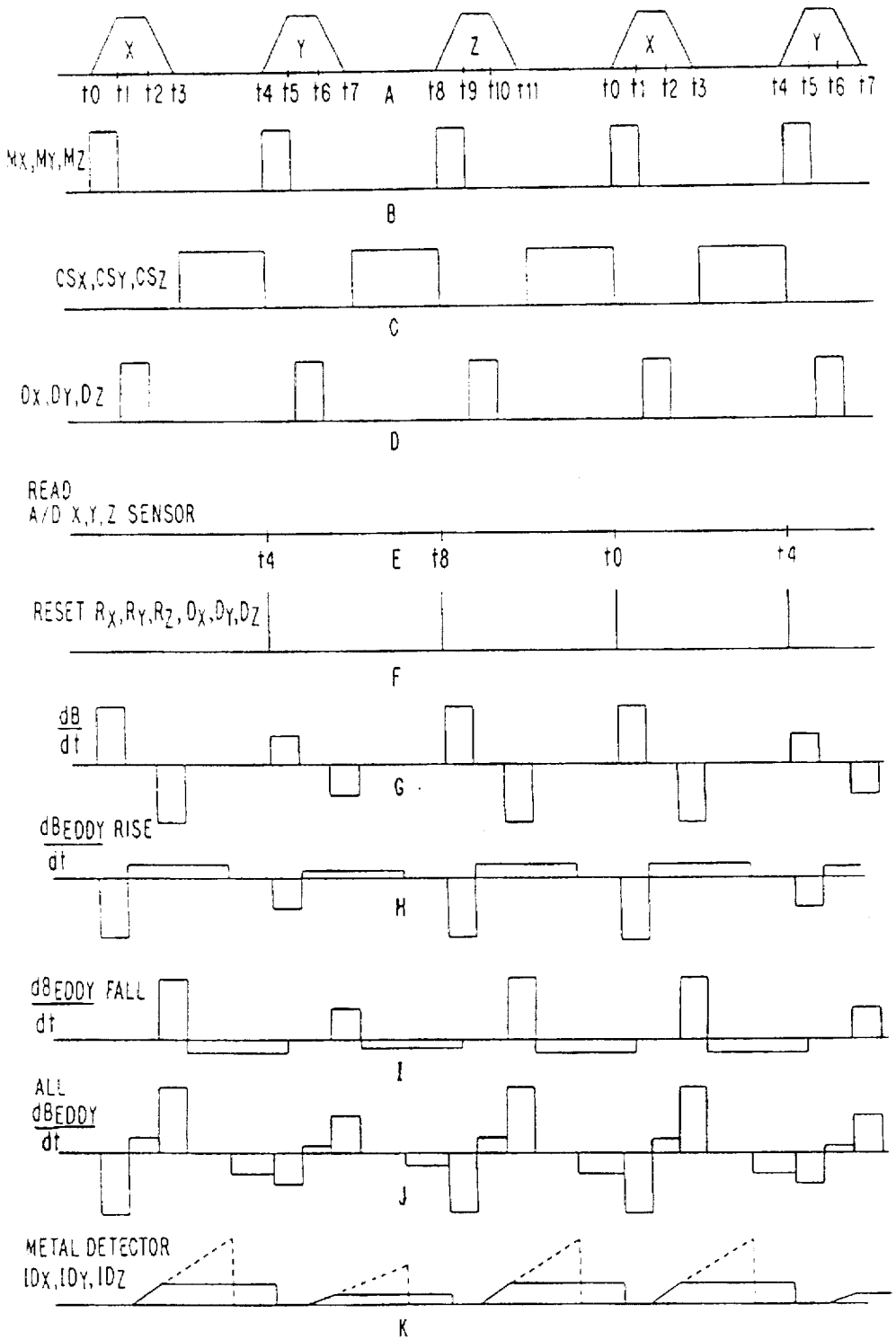
FIG. 5 shows a timing diagram for the system of FIG. 4.

As further shown in FIG. 4, the second embodiment of the present invention also includes a metal detector sub-circuit provided to actually detect metals adjacent to the space where the remote unit is located. The metal detector sub-circuit is generally designated by the reference numeral 51 and is seen to include electrical conductors 52, 53 and 54 that connect from the same conductors that interconnect the signals emanating from the preamplifiers P' and which are sent to the comparators C'. The conductors 52, 53 and 54 respectively connect with metal detector integrator switches $D_X$, $D_Y$ and $D_Z$ which respectively connect with integrators $ID_X$, $ID_Y$ and $ID_Z$, each of which has a reset switch identified by the respective reference letters $RD_X$, $RD_Y$ and $RD_Z$. The switches D are controlled by the microcomputer 11' as are the reset switches RD. Reference is made to FIG. 5 which depicts the timing diagram of the operation of the embodiment of FIG. 4.

The timing diagram in FIG. 5 shows the timing of the generated magnetic fields, eddy current distortion and the operation of the switches and reading into the computer of the sensed signals. The measure switches $M_X'$, $M_Y'$ and $M_Z'$ are closed just before the pulse is generated on the X source coil 17' until the generated pulse has reached its steady state. The metal detector integrator switches $D_X$, $D_Y$ and $D_Z$ are closed and the measure switches $M_X'$, $M_Y'$ and $M_Z'$ are opened when the generated pulse has reached its steady state. The computer, after a brief preset time, opens the detector switches $D_X$, $D_Y$ and $D_Z$ and returns the generated pulse to zero. The comparator switches $C_X$, $C_Y$ and $C_Z$ are then closed. The comparators measure the time derivative of the eddy currents' distortion on the three receiver coils. The reference voltage $V_{REF}$ on the comparators is preset to a low value. The output of the comparators will be high as long as the eddy current distortion is larger than the preset value. The comparators are set to only operate for negative voltages and the computer 11' is programmed to first receive a rising pulse before being interrupted on a falling pulse. The comparator switches are closed just after the generated field has returned to zero. The output of the comparators will be high as long as the eddy current distortion is larger (negative values) than the preset value. When the eddy current distortion on all the sensor coils is less than the preset value, the computer will be interrupted. The computer then reads the three measured integrator outputs and the three metal detector integrator outputs, and opens the comparator switches. The reset switches are closed for a brief moment while the above-mentioned switches are open in order to allow the system to reset the integrators to zero. Then a pulse is generated on the Y source coil 19' and the cycle is repeated. Then a pulse is generated on the Z source coil 21' and the cycle is repeated again. After the pulse on the Z source coil has ended and the integrators have been reset, then a pulse is generated on the X source coil to start a new cycle.

The short measured signal on the metal detector integrators and the eddy current distortion decay time are used to calculate the eddy current distortion.

If the eddy current distortion is simplified to be a straight line, the compensation will then be:

$$V_{EDDY} = \int_{t1}^{t2} \frac{dB_{EDDY}}{dt} dt \cdot \frac{\text{decay time}}{t2-t1}.$$

If the eddy current distortion is not a straight line but approximated by exponential curve, then the following equation is used:

$$V_{EDDY} = \int_{t1}^{\text{decay time}} \frac{k \cdot t^{-\alpha}}{dt} \cdot dt,$$

where 2 and K are formed from $$V(t2) = \int_{t1}^{t2} \frac{Kt^{-\alpha}}{dt} dt, \text{ and}$$

$$V(\text{decay time}) = \int_{t1}^{\text{decay time}} \frac{Kt^{-\alpha}}{dt} dt$$

Other equations approximating the eddy current distortion curve can be used for various degrees of accuracy.

The proportionality factor can also, if desired, be determined empirically by measuring the compensation factor for different metals by measuring the decay time and then the compensation factor for the system. The computer could then be programmed with a look-up table corresponding to each decay time and the system compensation factor.

The following measurements are made with further reference to FIG. 5:

1) V1 integration of the rise time (t0–t1) of the generated magnetic field, includes eddy current component.

$$V1 = \int_{t0}^{t1} \left( \frac{dB}{dt} + \frac{dB_{EDDY}}{dt} \right) dt$$

2) V2 integration of the rise time (t4–t5) of the generated magnetic field, includes eddy current component.

$$V2 = \int_{t4}^{t5} \left( \frac{dB}{dt} + \frac{dB_{EDDY}}{dt} \right) dt$$

3) V3 integration of the rise time (t8–t9) of the generated magnetic field, includes eddy current component.

$$V3 = \int_{t8}^{t9} \left( \frac{dB}{dt} + \frac{dB_{EDDY}}{dt} \right) dt$$

4) V11 integration of steady state component (t1–t2) of generated magnetic field, only includes part of rise time eddy current component.

$$V11 = \int_{t1}^{t2} \frac{dB_{EDDY}}{dt} dt$$

5) V22 integration of steady state component (t5–t6) of generated magnetic field, only includes part of rise time eddy current component.

$$V22 = \int_{t5}^{t6} \frac{dB_{EDDY}}{dt} dt$$

6) V33 integration of steady state component (t9–t10) of generated magnetic field, only includes part of rise time eddy current component.

$$V33 = \int_{t9}^{t10} \frac{dB_{EDDY}}{dt} dt$$

The eddy current distortion value is found for each source coil from the above equations and this value is subtracted from the signal containing both the generated magnetic field and the eddy current distortion.

The integrator offset errors and the errors due to rotation in the earth's magnetic field are different for this embodiment as compared to the embodiment of FIGS. 1–3, since the integrators are integrating for much shorter time periods. No compensation is necessary, when the two time intervals (for example, X source coil 17', (t1-t0)=(t2-t1)) are of the same length for the different source coil excitation. The simple subtraction of the two signals compensates directly.

These corrected values are used to calculate the remote object's position and orientation using an algorithm such as described in the Blood patents and outputs this data to the host computer 12'.

Figure 6:
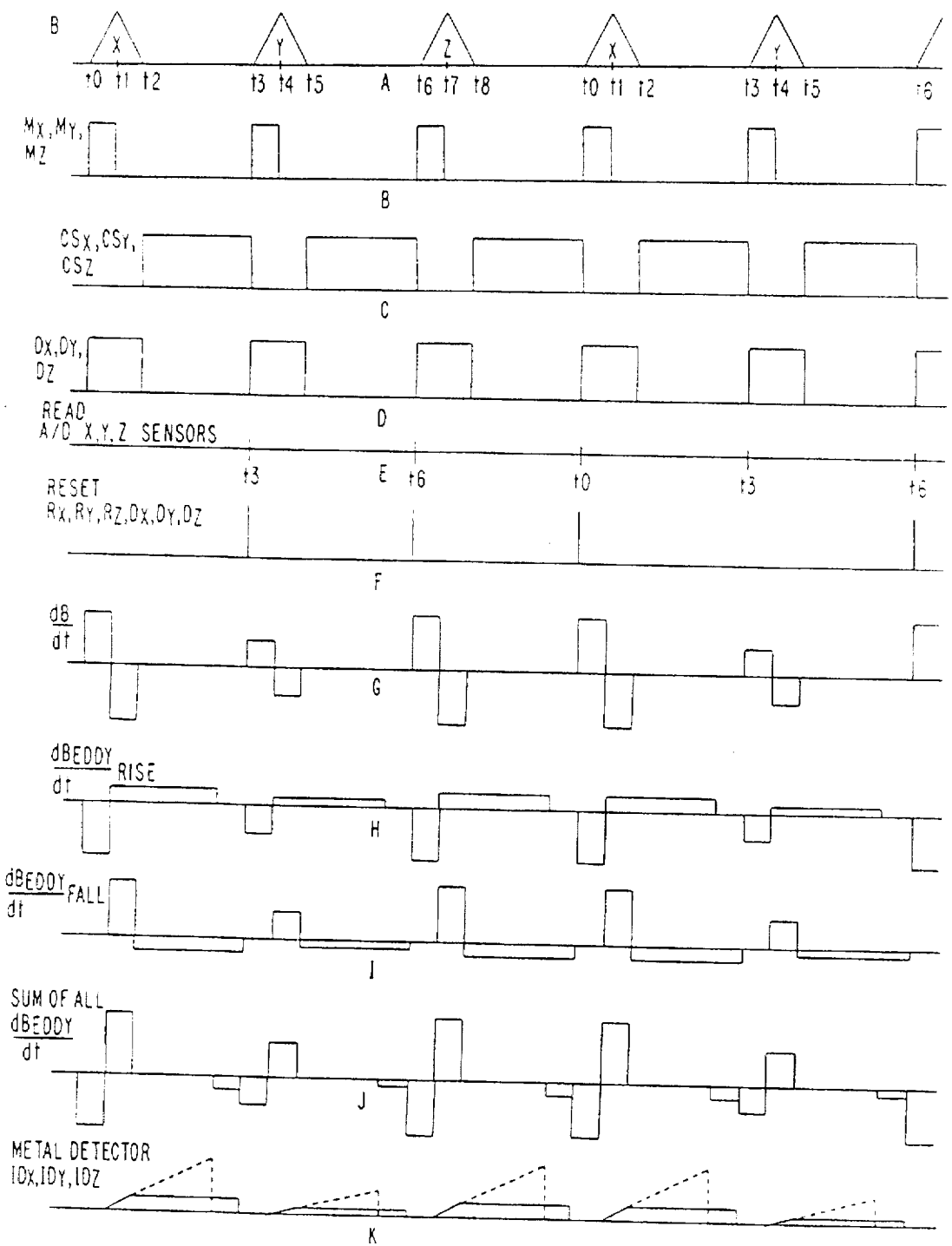
FIG. 6 shows a timing diagram for the third embodiment of a position and orientation measurement system employing the FIG. 4 block diagram.

FIG. 6 shows the timing diagram for a third embodiment of the present invention that employs the electrical circuitry described schematically in FIG. 4. The FIG. 6 embodiment of the present invention comprises a system that operates with no steady state components in the generated magnetic field. In this regard, line A of FIG. 6 shows the generated magnetic fields as triangular in nature having a rising leg and a falling leg with no steady state leg whatsoever. This embodiment teaches compensation means that controls dynamic adjustment of the set time period or time spacing between operation of the different source coils in a manner such that distortion caused by the eddy currents generated from one source coil will not affect the received magnetic field as generated from another source coil. As should be understood, the third embodiment of the present invention as depicted in the timing diagram of FIG. 6, wherein there is no steady state component of the generated magnetic fields, permits a simpler source coil driver and the use of lower power in the source. Alternatively, the same power as used in embodiments where a steady state is employed may also be employed to obtain effective operation at greater ranges. Furthermore, noise rejection of outside electronic sources is significantly enhanced.

The timing diagram in FIG. 6 shows the timing of the generated magnetic fields, eddy current distortion and the operation of the switches and reading into the computer of the sensed signals. The generated pulse can be a triangle, a square wave, a half-sinousoidal or any other shaped pulse. The measure switches $M_X'$, $M_Y'$ and $M_Z'$ and the detector switches $D_X$, $D_Y$ and $D_Z$ are closed just before the pulse is generated on the X source coil. The measure switches are opened when the pulse reaches its peak. The computer returns the generated pulse to zero and opens the detector switches. The comparators measure the time derivative of the eddy currents' distortion on the three receiver coils. The reference voltage on the comparators is preset to a low value. The comparator switches $CS_X'$, $CS_Y'$ and $CS_Z'$ are closed just after the generated field has returned to zero. The output of the comparators will be high as long as the eddy current distortion is larger than the preset value. The comparators are set to only operate for negative voltages and the computer is programmed to first receive a rising pulse before being interrupted on a falling pulse. The computer then controls the reading of the outputs of the measured integrators and the metal detectors. The comparator switches are opened and the reset switches are closed for a brief moment in order to allow the system to reset the integrators to zero. Then a pulse is generated on the Y source coil and the cycle is repeated. Then a pulse is generated on the Z source coil and the cycle is repeated again. After the pulse on the Z source coil has ended and the integrators have been reset, then a pulse is generated on the X source coil to start a new cycle.

The measured signals on the metal detectors and eddy current distortion decay time are used to calculate the eddy current distortion. The metal detectors measure a signal proportional to only the eddy current decay generated from the rising edge of the source coil field only. Since the integration of the whole pulse will cancel out the eddy current distortion generated during the rise time with the eddy current distortion during the fall time, only the decay of the eddy current distortion generated from the rise time will be included. If the generated pulse is a perfect triangle (rise edge is equal to the falling edge) and the eddy current distortion is simplified to be a straight line, the compensation will then be:

$$V_{EDDY} = \int_{t0}^{t2} \left( \frac{dB}{dt} + \frac{dB_{EDDY}}{dt} \right) dt \frac{\text{decay time}}{t2-t1} =$$

$$\int_{t1}^{t2} \frac{dB_{EDDY}}{dt} dt \frac{\text{decay time}}{t2-t1}$$

If the generated pulse is not a perfect triangle and if the eddy current distortion is not a straight line, but may be approximated by an exponential curve, other compensation formulas must be used, as explained above. Other equations approximating the eddy current distortion can be used as appropriate. Empirical measurements of the proportional factor can also be made as described above concerning the second embodiment.

The following measurements are made:

1) V1 integration of the rise time (t0–t1) of the generated magnetic field, includes the eddy current component.

$$V1 = \int_{t0}^{t1} \left( \frac{dB}{dt} + \frac{dB_{EDDY}}{dt} \right) dt$$

2) V2 integration of the rise time (t3–t4) of the generated magnetic field, includes the eddy current component.

$$V2 = \int_{t3}^{t4} \left( \frac{dB}{dt} + \frac{dB_{EDDY}}{dt} \right) dt$$

3) V3 integration of the rise time (t6–t7) of the generated magnetic field, includes the eddy current component.

$$V3 = \int_{t6}^{t7} \left( \frac{dB}{dt} + \frac{dB_{EDDY}}{dt} \right) dt$$

4) V11 integration of the whole pulse (t0–t2) of generated magnetic field; this calculation only includes part of rise time eddy current decay component, since the contribution from the pulse will be zero for a triangle pulse.

$$V11 = \int_{t0}^{t2} \left( \frac{dB}{dt} + \frac{dB_{EDDY}}{dt} \right) dt = \int_{t1}^{t2} \left( \frac{dB_{EDDY}}{dt} \right) dt$$

5) V22 integration of the whole pulse (t3–t5) of generated magnetic field; this integration only includes part of rise time eddy current decay component, since the contribution from the pulse will be zero for a triangle pulse.

$$V22 = \int_{t3}^{t5} \left( \frac{dB}{dt} + \frac{dB_{EDDY}}{dt} \right) dt = \int_{t4}^{t5} \left( \frac{dB_{EDDY}}{dt} \right) dt$$

6) V33 integration of the whole pulse (t6–t8) of generated magnetic field; this integration only includes part of rise time eddy current decay component, since the contribution from the pulse will be zero for triangle pulse.

$$V33 = \int_{t6}^{t8} \left( \frac{dB}{dt} + \frac{dB_{EDDY}}{dt} \right) dt = \int_{t7}^{t8} \left( \frac{dB_{EDDY}}{dt} \right) dt$$

The actual eddy current distortion is found when each source coil is active from the above calculations and is subtracted from the signal containing both the generated magnetic field and the eddy current distortion in the computer 11'.

The integrator offsets are different for this embodiment as compared to prior discussed embodiments since the integrators are activated for much shorter times. No compensation is necessary when the two time intervals (for X source coil 17', t1-t0≈t2-t0) are almost the same length for the different source coil excitation. The simple subtraction of the two signals compensates directly. The correct compensation can easily be found by any person skilled in the art.

These corrected values may be used to calculate the remote object's position and orientation using an algorithm such as described in the Blood patents as explained above. This data is outputted to the host computer 12'.

Figure 7:
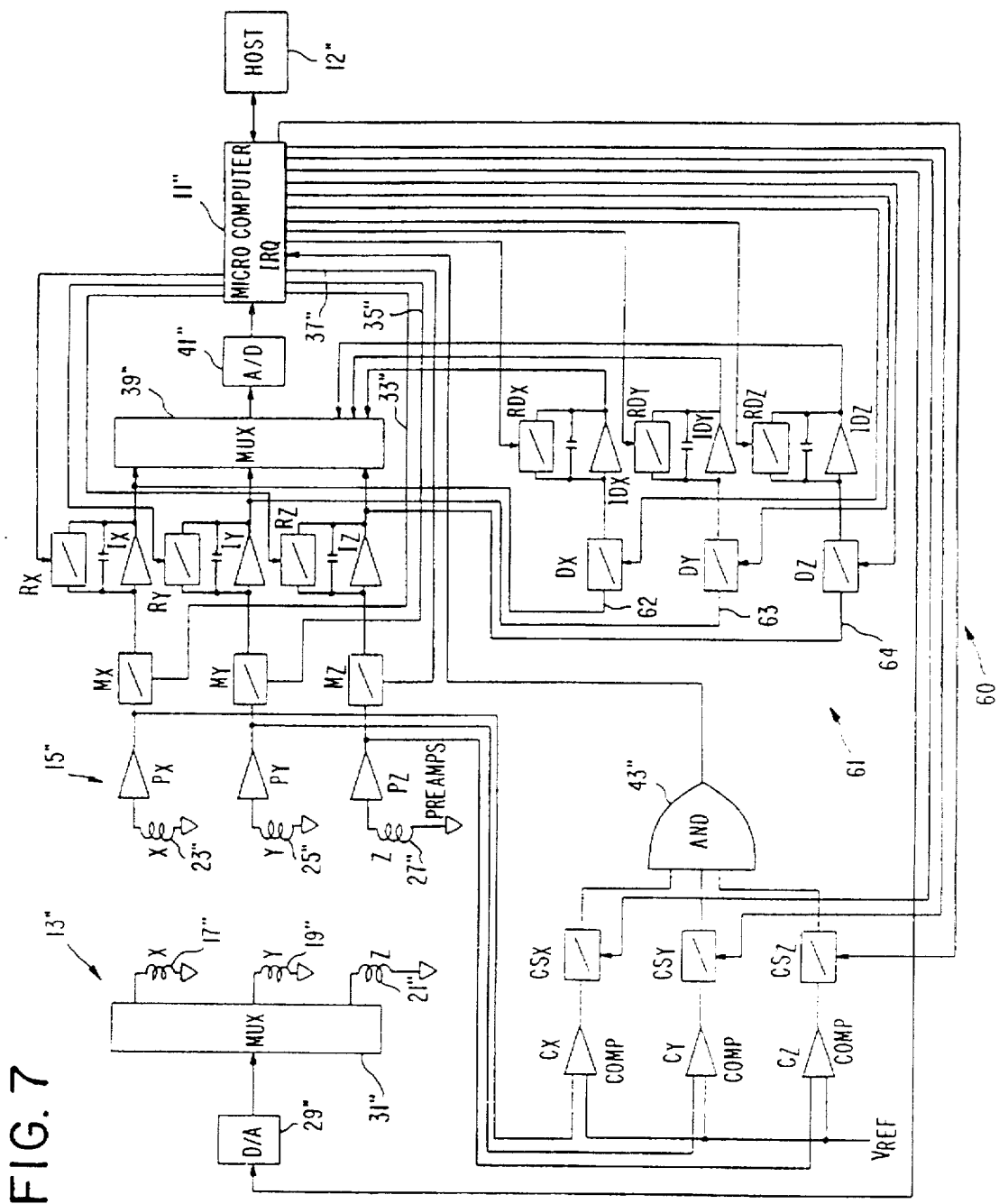
FIG. 7 shows a block diagram of the fourth embodiment of a position and orientation measurement system according to the present invention.

FIG. 7 schematically depicts the electrical circuitry of a fourth embodiment of the present invention. As compared to FIG. 1, like elements are shown using like double primed reference numerals and reference letters. As compared to FIG. 4, like elements are depicted using like primed reference numerals and reference letters.

With reference to FIG. 7, the fourth embodiment of the present invention is generally designated by the reference numeral 60 and is seen to include a microcomputer 11" that controls operation of the system and a host computer 12".

The fourth embodiment includes a fixed unit 13" and a remote unit 15". The fixed unit includes three mutually orthogonally directed magnetic field generating coils 17", 19" and 21" identified by the three-dimensional designations "X", "Y" and "Z", respectively. The remote unit includes three mutually orthogonally located passive sensor coils 23", 25" and 27" that are identified by the three-dimensional identifiers "X", "Y" and "Z", respectively.

As seen in FIG. 7, the microcomputer 11" controls operation of the source coils 17", 19" and 21" via a D/A converter 29" and a multiplexer 31" that is operated by the microcomputer 11" to sequentially pulse the respective coils 17", 19" and 21".

As also seen in FIG. 7, each of the sensor coils 23", 25" and 27" is followed by a preamplifier $P_X$", $P_Y$" and $P_Z$", respectively. Each preamplifier supplies a signal to a measure switch $M_X$", $M_Y$" and $M_Z$", respectively, the operation of which are controlled by the microcomputer 11" as shown with the control lines 33", 35" and 37", respectively.

When a measure switch M" is closed, a signal is supplied to an integrator provided for each sensor 23", 25" and 27", with the integrators being respectively identified by the reference letters $I_X$", $I_Y$" and $I_Z$", respectively. Respective reset switches $R_X$", $R_Y$" and $R_Z$" are provided for each integrator to clear each integrator after an integration has been completed. Integrated signals from the integrators I" are supplied to the microcomputer 11" via a multiplexer 39" and an A/D converter 41". The multiplexer sequentially supplies the signals received from the coils 23", 25" and 27".

As further seen in FIG. 7, the system includes an eddy current detector for each of the three channels. The eddy current detector comprises comparators $C_X$", $C_Y$" and $C_Z$", respectively, for each respective sensor 23", 25" and 27". Each comparator has one input that consists of a signal received from a respective preamplifier for a respective sensor coil 23", 25" or 27" and, as another input, $V_{REF}$, a reference voltage that is preset to a low value such that the output of the comparators will be high as long as the eddy current distortion is larger than $V_{REF}$. As seen, in FIG. 7, an AND gate 43" receives signals from the respective comparators via switches $CS_X$", $CS_Y$" and $CS_Z$" that are suitably controlled by the microcomputer 11". Thus, when the switch $CS_X$" is closed by the microcomputer 11", so long as the signal received by the comparator $C_X$" from the coil 23" is higher than $V_{REF}$, the comparator $C_X$" is "high" and this status is received by the AND gate 43". The same is true of the comparators $C_Y$" and $C_Z$". The conductor 45" connects the AND gate 43" with an interrupt circuit in the microcomputer 11". When the eddy current distortion of all of the sensor coils 23", 25" and 27", reduces to less than $V_{REF}$, the comparators $C_X$", $C_Y$" and $C_Z$" go to a "low" status and when this is sensed in the conductor 45", the interrupt circuit of the microcomputer is activated to deactivate the coil 17", 19" or 21".

As further shown in FIG. 7, the fourth embodiment of the present invention also includes a metal detector sub-system provided to actually detect metals adjacent to the space where the remote unit is located. In FIG. 4, for the second embodiment, the metal detector sub-circuit includes electrical conductors 52, 53 and 54 that connect from the same conductors that interconnect the signals emanating from the preamplifiers P' and which are sent to the comparators C'.

The conductors 52, 53 and 54 respectively connect with metal detector integrator switches $D_{X'}$, $D_{Y'}$ and $D_{Z'}$ which respectively connect with integrators $ID_{X'}$, $ID_{Y'}$ and $ID_{Z'}$, each of which has a reset switch identified by the respective reference letters $RD_{X'}$, $RD_{Y'}$ and $RD_{Z'}$. The switches D are controlled by the microcomputer 11' as are the reset switches RD. In contrast, in the embodiment of FIG. 7, the metal detector sub-system 61 is interconnected into the rest of the system 60 via electrical conductors 62, 63 and 64 that respectively interconnect into the circuitry just after the integrators $I_X"$, $I_Y41$ and $I_Z"$, respectively. Thus, the metal detector sub-system 61 is being used to analyze integrated signals that are further integrated within the integrators $ID_{X'}$, $ID_{Y'}$ and $ID_{Z'}$, of the metal detector sub-system 61.

Figure 8:
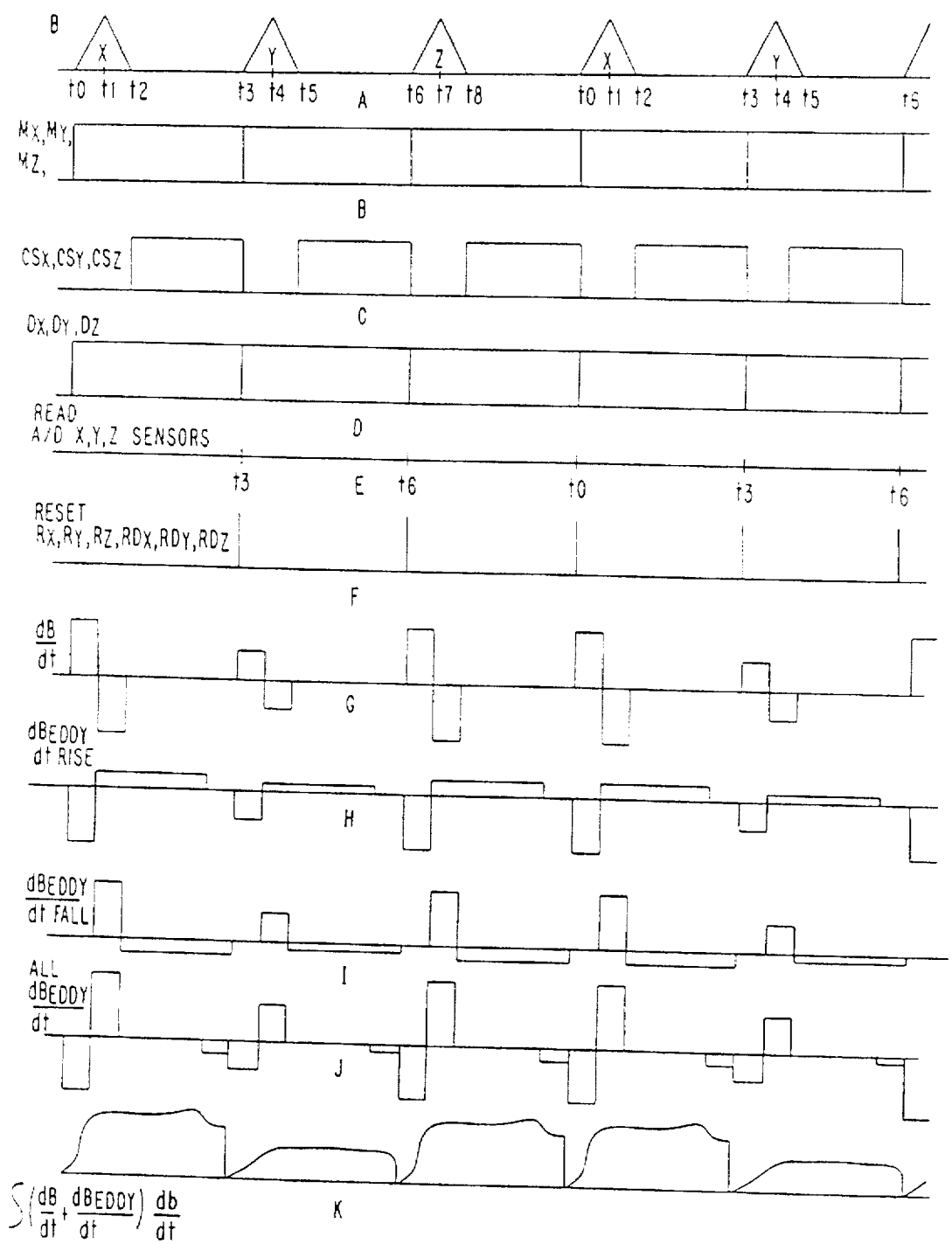
FIG. 8 shows a timing diagram for the system of FIG. 7.

The timing diagram for the magnetic fields, the eddy current distortion and the switch operation is shown in FIG. 8. As should be seen from line A of FIG. 8, the magnetic fields are generated with no steady state component. That is, each generated magnetic field is triangular in nature having a rising line and a descending line with no steady state line. The timing diagram teaches dynamic adjustment of the time delay between termination of the operation of one source coil and commencement of operation of the next sequential source coil. Such dynamic adjustment is undertaken so that the eddy current distortion generated from one source coil will not affect the received magnetic field generated from the next sequential source coil. As is the case in prior described embodiments, where a magnetic field is generated on the source coils that includes no steady state component, power requirements are reduced or, alternatively, the same power requirements may be employed to achieve greater range.

The measure switches $M_X"$, $M_Y"$ and $M_Z"$ and the metal detector integrator switches $D_X'$, $D_Y'$ and $D_Z'$ are closed just before the pulse is generated on the X source coil 17". The comparators measure the time derivative of the eddy current distortion on the three receiver coils 23", 25" and 27". The reference voltage $V_{REF}$ on the comparators is preset to a low value. The comparator switches $CS_X"$, $CS_Y"$ and $CS_Z"$ are closed just after the generated field has returned to zero. The output of the comparators will be high as long as the eddy current distortion is larger than the preset value. The comparators are set to only operate for negative voltages and the computer is programmed to first receive a rising pulse before being interrupted on a falling pulse. When the eddy current distortion of all the sensor coils is less than the preset value, the computer will be interrupted. The computer controls the reading of the output of the measured integrators and the metal detector integrators. The computer then opens the measure switches, the metal detector integrator switches, and the comparator switches. The reset switches are closed for a brief moment while these switches are open in order to allow the system to reset the integrators to zero. Then a pulse is generated on the Y source coil and the cycle is repeated. Then a pulse is generated on the Z source coil and the cycle is repeated again. After the pulse on the Z source coil has ended and the integrators have been reset, then a pulse is generated on the X source coil to start a new cycle.

The output of the second integrator does not include any eddy current distortion component since both the rise and the fall time components will cancel themselves out. The output is directly proportional with the integration of the generated pulse only. If the generated pulse is a triangle, the magnetic field can be found from:

V=½ (t1-t0) B

If the generated pulse is not a perfect triangle, other approximations must be made as explained above.

The following measurements are made:
1) V1 double integration of the pulse until the eddy current distortion has died out (t0–t3) includes no eddy current component.

$$V1 = \int_{t0}^{t3} \left( \int_{t0}^{t3} \left( \frac{dB}{dt} + \frac{dB_{EDDY}}{dt} \right) dt \right) dt = \int_{t0}^{t3} B\, dt$$

2) V2 double integration of the pulse until the eddy current distortion has died out (t3–t6) includes no eddy current component.

$$V2 = \int_{t3}^{t6} \left( \int_{t3}^{t6} \left( \frac{dB}{dt} + \frac{dB_{EDDY}}{dt} \right) dt \right) dt = \int_{t3}^{t6} B\, dt$$

3) V3 double integration of the pulse until the eddy current distortion has died out (t6-t0) includes no eddy current component.

$$V3 = \int_{t6}^{t0} \left( \int_{t6}^{t0} \left( \frac{dB}{dt} + \frac{dB_{EDDY}}{dt} \right) dt \right) dt = \int_{t6}^{t0} B\, dt$$

No compensation for the eddy current distortion is necessary as explained above.

The integrator offset errors and the errors due to rotation in the earth's magnetic field are different for this embodiment since the signals are being integrated twice. The integration is carried out for the whole pulse period until the eddy current distortion has died out. Compensation for the electronic offset errors and errors induced from rotations in the earth's magnetic field must be made by measurements of the errors only, when no magnetic field is being generated and no eddy current distortion is present. This can happen after the measurements have been taken from the Z source coil generation, before the X source coil of the next cycle is being activated. The offset errors are measured for as long a time as the measurement interval (t3-t0), and the compensation is made as taught under the first embodiment shown in FIG. 1.

These corrected values are used to calculate the remote object's position and orientation using an algorithm such as described in the Blood patents. This data is outputted to the host computer 12".

Figure 9:
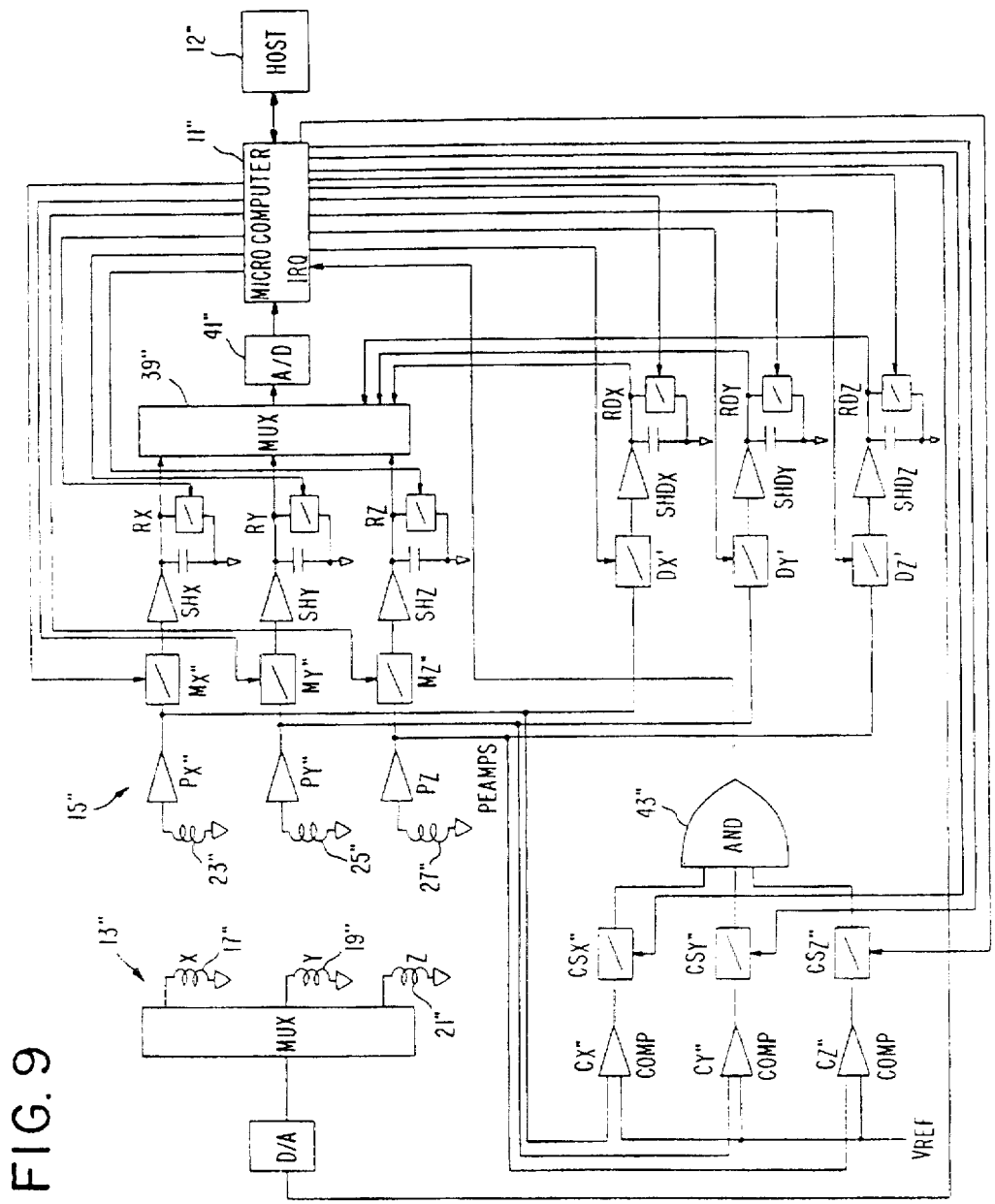
FIG. 9 shows a block diagram of the fifth embodiment of a position and orientation measurement system according to the present invention.

Reference is now made to FIG. 9 which shows a schematic representation of the electrical circuitry for a fifth embodiment of the present invention. In FIG. 9, as compared to FIG. 4, like elements are depicted employing like primed or double primed reference numerals or reference letters, as the case may be.

FIG. 9 includes the microcomputer 11", the host computer 12", the fixed unit 13", the remote unit 15", the "X", "Y" and "Z" source coils 17", 19" and 21", respectively, while the remote unit 15" includes the respective "X", "Y" and "Z" receiver coils 23", 25" and 27".

Preamplifiers $P_X"$, and $P_Y"$ and $P_Z"$ are included along with the corresponding switches $M_X"$, $M_Y41$ and $M_Z"$.

Additionally, the comparators $C_X"$, $C_Y"$ and $C_Z"$ are interconnected into the circuitry just beyond the respective preamplifiers $P_X"$, $P_Y"$ and $P_Z"$. Each comparator includes a second input connected to a source of reference voltage $V_{REF}$. Each comparator leads to an AND gate 43" via respective switches $CS_X"$, $CS_Y"$ and $CS_Z"$. These switches are controlled by the microcomputer 11" as shown.

As also shown in FIG. 9, the same conductors connecting beyond the preamplifiers to the comparators also feed detector switches $D_X'$, $D_Y'$ and $D_Z'$, each of which is controlled by the microcomputer 11" and supplies the signals beyond the preamplifiers to sample-and-hold circuits $SHD_X$, $SHD_Y$ and $SHD_Z$, each of which has its own reset switch $RD_X$, $RD_Y$ and $RD_Z$, respectively. The reset switches are controlled by the microcomputer 11" as shown. These are the metal detector circuits.

As further shown in FIG. 9, the measure switches $M_X"$, $M_Y"$ and $M_Z"$ control conduction of data from the preamplifiers to additional sample-and-hold circuits $SH_X$, $SH_Y$ and $SH_Z$, respectively, each of which has its own reset switch $R_X$, $R_Y$ and $R_Z$, respectively, which, as shown, are controlled by the microcomputer 11". Signals emanating from the sample-and-hold circuits SH are supplied to the microcomputer 11" via the multiplexer 39" and the A/D converter 41".

Figure 10:
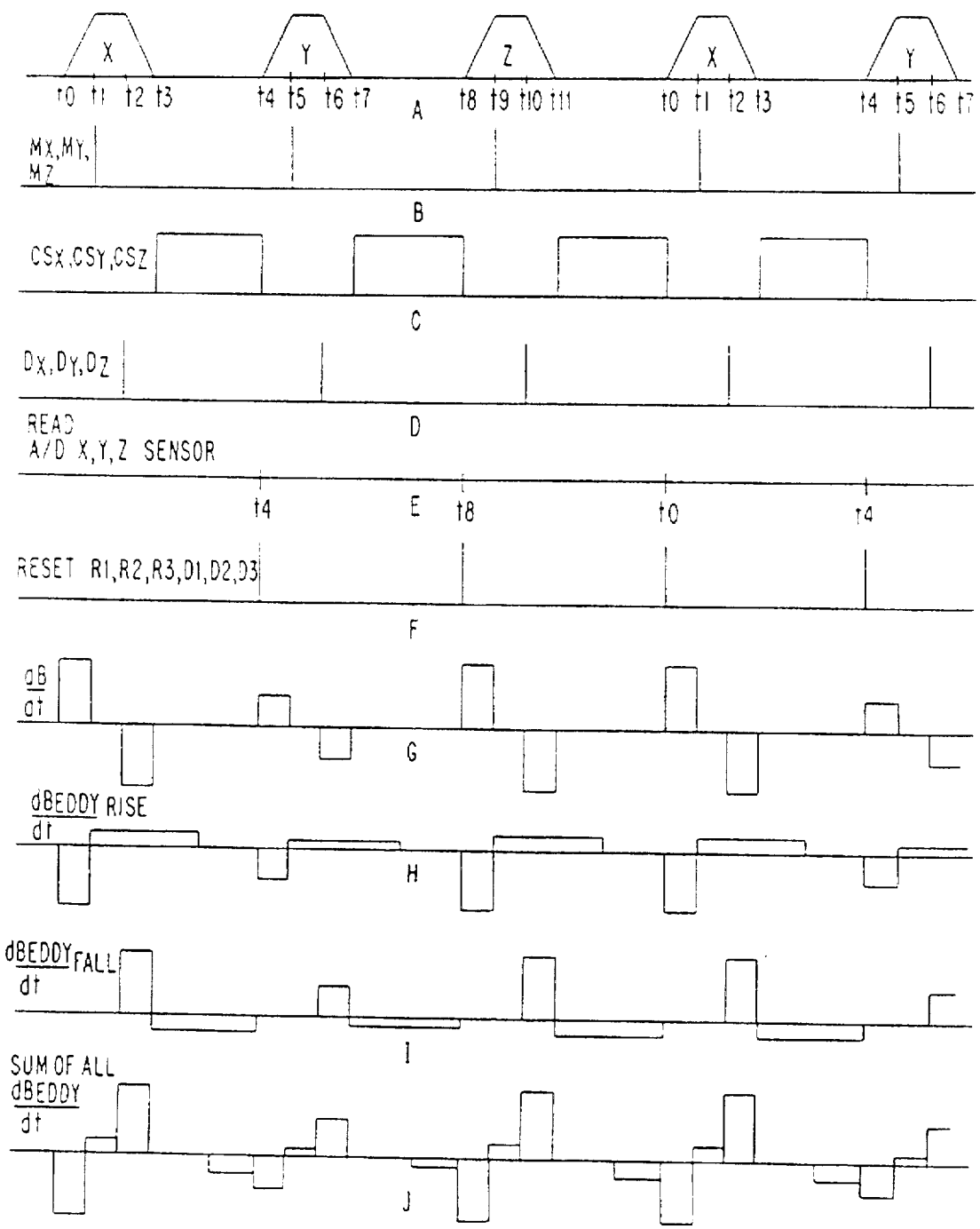
FIG. 10 shows a timing diagram for the system of FIG. 9.

With the above description of the electrical circuitry depicted in FIG. 9 in mind, reference is now made to FIG. 10 which depicts the timing diagram describing the operation of the circuitry of FIG. 9.

The measure switches $M_X"$, $M_Y"$ and $M_Z"$ are closed for a short time just before the pulse generated on the X source coil 17" has reached its steady state. The metal detector sample-and-hold sub-circuit switches $D_X'$, $D_Y'$ and $D_Z'$ are closed for a short time at the end of the steady state component of the magnetic field. The computer 11" turns off the signal on the X transmitter coil 17". The comparators $C_X"$, $C_Y"$ and $C_Z"$ measure the time derivative of the eddy current distortion on the three receiver coils 23", 25" and 27". The reference voltage $V_{REF}$ on the comparators is preset to a low value. The comparator switches $CS_X"$, $CS_Y"$ and $CS_Z"$ are closed just after the generated field has returned to zero at time t3. The output of the comparators will be high as long as the eddy current distortion is larger than the preset value of $V_{REF}$. The comparators are set to only operate for negative voltages, such as exists between times t3 and t4, and the computer 11" is programmed to first receive a rising pulse before being interrupted on a falling pulse. When the eddy current distortion of all the sensor coils combined is less than the preset value $V_{REF}$, the computer 11" will be interrupted via an interrupt sub-circuit. The computer 11" controls the reading of the outputs of all the sample-and-hold circuits SH and SHD. The reset switches R and RD are closed for a brief moment in order to allow the system to reset the sample-and-hold circuits to zero. Then a pulse is generated on the Y source coil 19" and the cycle is repeated. Then a pulse is generated on the Z source coil 21" and the cycle is repeated again. After the pulse on the Z source coil has ended and the sample-and-hold circuits have been reset, then a pulse is generated on the X source coil to start a new cycle.

The outputs of the measured sample-and-hold circuits SH are the sum of the time derivative of the magnetic field generated from the activated source coil and the eddy current distortion. The output of the metal detector sample-and-hold circuits SHD is proportional to the time derivative of the magnetic field generated from the eddy currents only.

The total eddy current distortion can be found from the metal detector measurement multiplied by the eddy current decay time divided by the time period defined by t1-t0, if the eddy current distortion may be approximated to a straight line. If the eddy current distortion is approximated to an exponential slope or other curve, a different approximation must be made as explained hereinabove.

A simple subtraction of the two signals will result in a result signal, that is only proportional to the time derivative of the magnetic field generated from the source coil alone. The magnetic field value can then be found by multiplying this number by the time period t1-t0, if the rise time is a straight line. If the rise time has a different slope, a different multiplication factor must be found as should be evident.

The following measurements are made:

1) V1 sample-and-hold of the time derivative of the generated magnetic field at t1, including eddy current component.

$$V1 = \frac{dB(t1)}{dt} + \frac{dB_{EDDY}}{dt} \quad (t1)$$

2) V2 sample-and-hold of the time derivative of the generated magnetic field at t5, including eddy current component.

$$V2 = \frac{dB(t5)}{dt} + \frac{dB_{EDDY}}{dt} \quad (t5)$$

3) V3 sample-and-hold of the time derivative of the generated magnetic field at t9, including eddy current component.

$$V3 = \frac{dB(t9)}{dt} + \frac{dB_{EDDY}}{dt} \quad (t9)$$

4) V11 sample-and-hold of the time derivative of the generated magnetic field at t2, includes only eddy current component.

$$V11 = \frac{dB_{EDDY}}{dt} \, (t2); \, \frac{dB_{EDDY}(t1)}{dt} = \frac{dB_{EDDY}(t2)}{dt} \, \frac{\text{decay time}}{t1-t0}$$

5) V22 sample-and-hold of the time derivative of the generated magnetic field at t6, includes only eddy current component.

$$V22 = \frac{dB_{EDDY}}{dt} \, (t6); \, \frac{dB_{EDDY}(t5)}{dt} = \frac{dB_{EDDY}(t6)}{dt} \, \frac{\text{decay time}}{t5-t4}$$

6) V33 sample-and-hold of the time derivative of the generated magnetic field at t10, includes only eddy current component.

$$V33 = \frac{dB_{EDDY}}{dt} \, (t10); \, \frac{dB_{EDDY}(t9)}{dt} =$$

$$\frac{dB_{EDDY}(t10)}{dt} \, \frac{\text{decay time}}{t9-t8}$$

The correct eddy current distortion is found for each source coil, when activated, from the above equations and is subtracted from the signal containing both the generated magnetic field and the eddy current distortion. The generated magnetic field is then calculated for each sensor coil.

Electronic offset errors or errors due to rotations in the earth's magnetic field, such as described above with reference to FIG. 3, do not need to be compensated for since the measurements are taken for only brief moments and no integrators are needed in this embodiment.

The corrected values derived from calculating the above equations are used to calculate the position and orientation of the remote unit 15" using an algorithm such as is described in the Blood patents. This data is outputted to the host computer 12".

Figure 11:
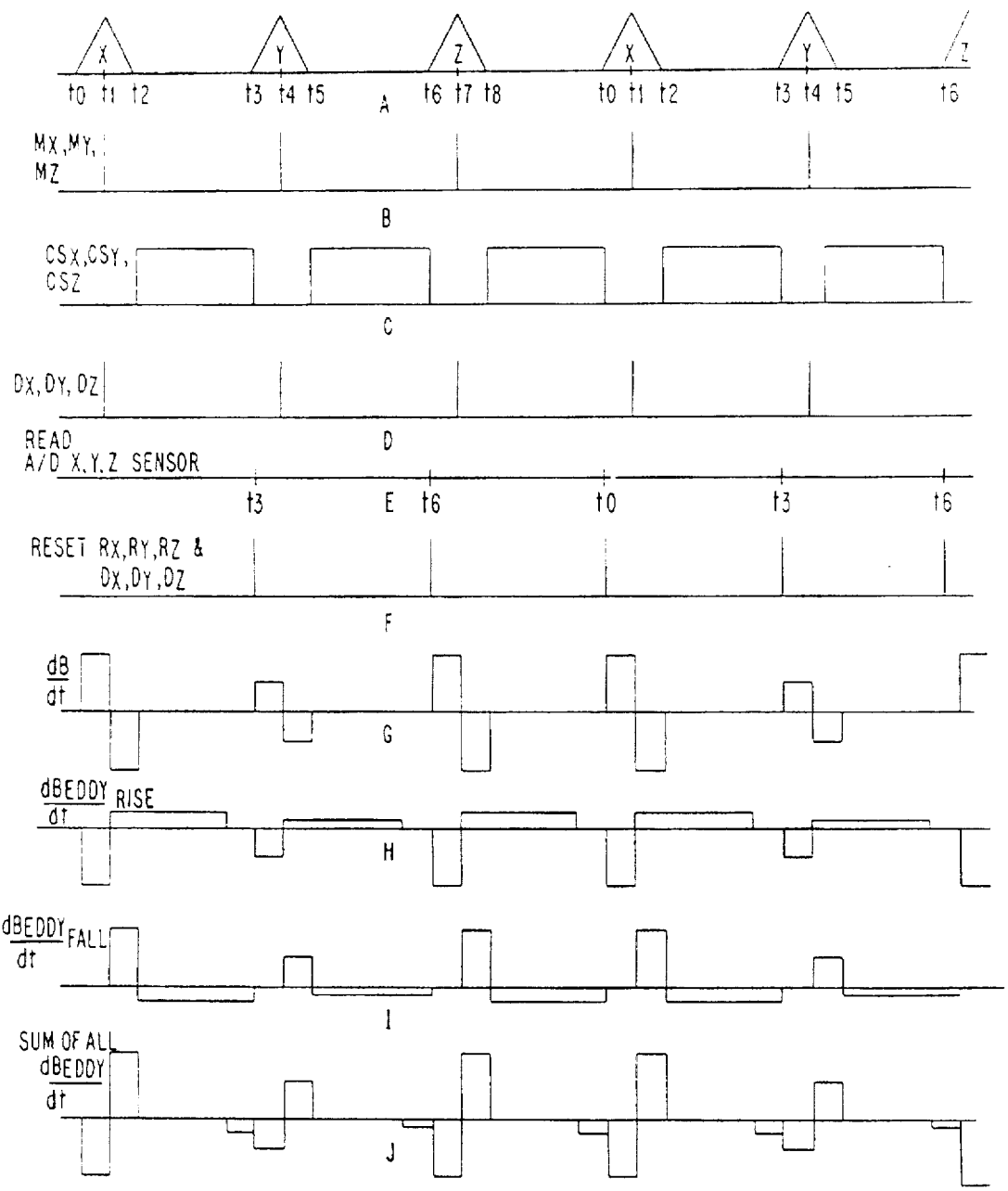
FIG. 11 shows a timing diagram for the system of FIG. 9 operating with no steady state components.

FIG. 11 shows a different timing diagram for the fifth embodiment, facilitating operation with no steady state component. The modified embodiment now utilizes a triangular pulse with no steady state component. The electronics are shown in FIG. 9 with timing diagram shown in FIG. 11, and everything operates as described above. The first sample-and-hold circuit is set (measures) just before the source coil reaches its peak and the metal detector sample-and-hold circuit is set (measures) just after the source coil is starting to return the energy to zero. The following aspects are measured:

1) V1 sample-and-hold of the time derivative of the generated magnetic field at t1, including eddy current component.

$$V1 = \frac{dB(t1)}{dt} + \frac{dB_{EDDY}(t1)}{dt} = \frac{dB\text{ (rise)}}{dt} + \frac{dB_{EDDY}\text{ (rise)}}{dt}$$

2) V2 sample-and-hold of the time derivative of the generated magnetic field at t4, including eddy current component.

$$V2 = \frac{dB(t4)}{dt} + \frac{dB_{EDDY}(t4)}{dt} = \frac{dB\text{ (rise)}}{dt} + \frac{dB_{EDDY}\text{ (rise)}}{dt}$$

3) V3 sample-and-hold of the time derivative of the generated magnetic field at t7, including eddy current component.

$$V3 = \frac{dB(t7)}{dt} + \frac{dB_{EDDY}(t7)}{dt} = \frac{dB\text{ (rise)}}{dt} + \frac{dB_{EDDY}\text{ (rise)}}{dt}$$

4) V11 sample-and-hold of the time derivative of the generated magnetic field at t1+Δt, including the eddy current component.

$$V11 = \frac{dB\text{ (fall)}}{dt} + \frac{dB_{EDDY}\text{ (fall)}}{dt} +$$

$$K\frac{dB_{EDDY}\text{ (rise)}}{dt} ; \frac{dB_{EDDY}\text{ (rise)}}{dt} = (V11 + V1)\frac{\text{decay time}}{t1 - t0}$$

5) V22 sample-and-hold of the time derivative of the generated magnetic field at t4+Δt, including the eddy current component.

$$V22 = \frac{dB\text{ (fall)}}{dt} + \frac{dB_{EDDY}\text{ (fall)}}{dt} +$$

$$K\frac{dB_{EDDY}\text{ (rise)}}{dt} ; \frac{dB_{EDDY}\text{ (rise)}}{dt} = (V22 + V2)\frac{\text{decay time}}{t4 - t3}$$

6) V33 sample-and-hold of the time derivative of the generated magnetic field at t7+Δt, including the eddy current component.

$$V33 = \frac{dB\text{(fall)}}{dt} + \frac{dB_{EDDY}\text{(fall)}}{dt} +$$

$$K\frac{dB_{EDDY}\text{(rise)}}{dt} ; \frac{dB_{EDDY}\text{(rise)}}{dt} = (V33 + V3)\frac{\text{decay time}}{t7 - t6}$$

The corrected values derived from calculating the above equations are used to calculate the position and orientation of the remote unit 15" using an algorithm such as described in the Blood patents. This data is outputted to the host computer 12".

Figure 12:
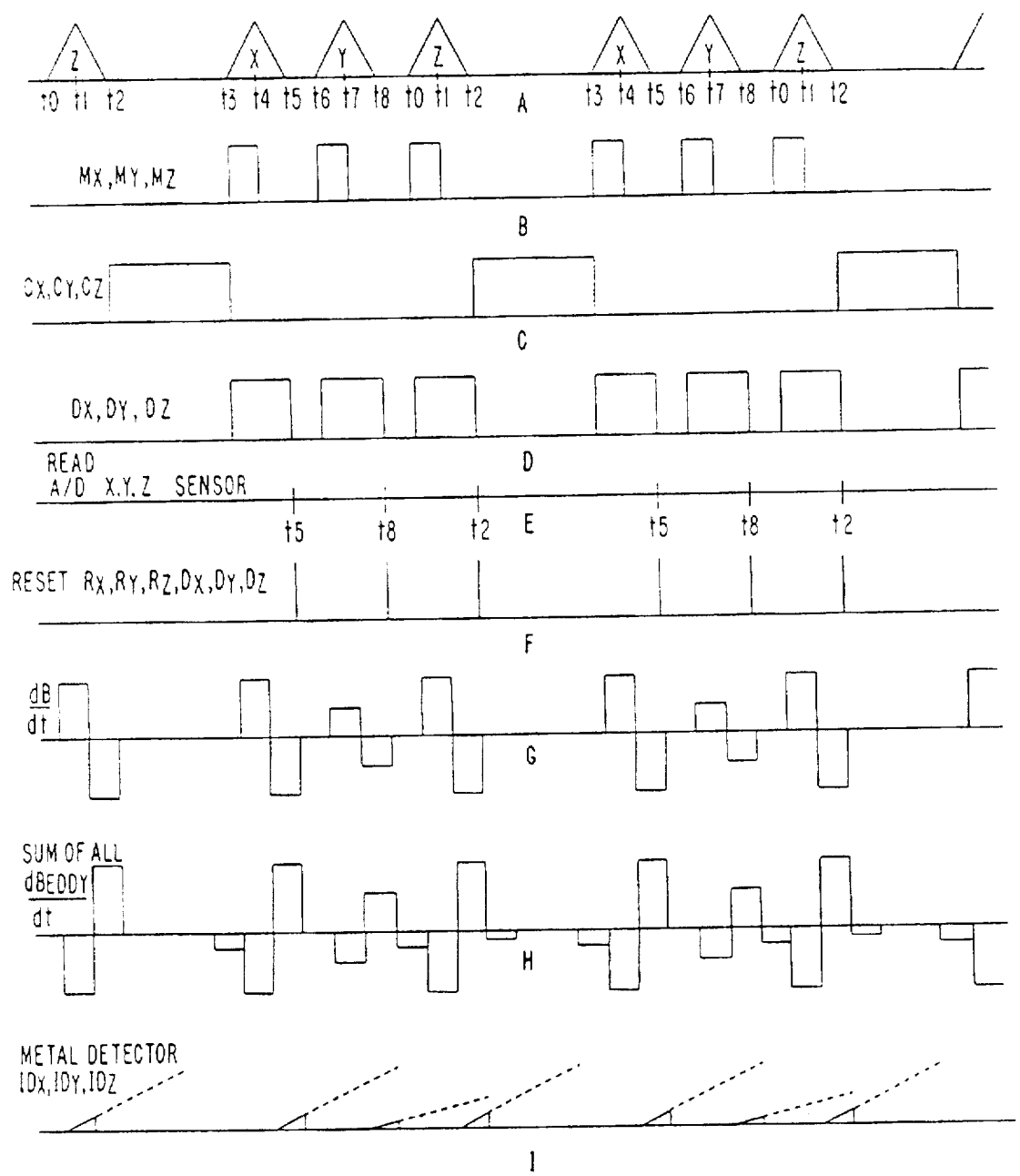
FIG. 12 shows a timing diagram for the sixth embodiment of a position and orientation measurement system employing the FIG. 4 block diagram.

The sixth embodiment is now described with reference to FIG. 12 and a timing diagram is depicted that is intended to operate on the electrical circuitry depicted in FIG. 4. A basic difference between the timing diagram of FIG. 12 and that of FIG. 6 includes the fact that the FIG. 12 timing diagram teaches operation of the FIG. 4 circuitry with the magnetic fields on the source coils 17", 19" and 21" being generated without steady state components, and activation of the next source coil before the eddy current distortion has died out from the present source coil. Line A of FIG. 12 shows the triangular nature of the source coil activations and deactivations including an upwardly sloping rise to an apex instantaneously followed by a sloping descent to zero. The FIG. 12 timing diagram also teaches dynamic adjustment of the spacing of time between deactivation of one source coil and activation of the next sequential source coil in such a manner that the eddy current distortion generated from the first-mentioned source coil will not affect readings based upon the magnetic field generated from the next sequential source coil even though they have not died out. As should be understood, and as explained hereinabove concerning other embodiments, where the system is able to operate without the requirement of a steady state component of the generated magnetic field, the transmitter driver may be of more simple construction and the power requirements are significantly reduced in the transmitter. Alternatively, the same power requirements as needed where a steady state component of the magnetic field will be employed may be provided to allow operation at increased range of distance. The invention, as should be understood with reference to FIG. 12, allows for faster update rates of the measurements.

The timing diagram in FIG. 12 shows the timing of the generated magnetic fields, eddy current distortion and the operation of the switches and reading into the computer of the sensed signals. The computer 11' starts with generating a pulse on the Z source coil 21'. The comparator switches $C_X'$, $C_Y'$ and $C_Z'$ are closed when the pulse is returned to zero. The comparators measure the time derivative of the eddy current distortion received on the three receiver coils 23', 25' and 27'. The reference voltage $V_{REF}$ on the comparators is preset to a low value. The output of the comparators will be high as long as the eddy current distortion is larger than the preset value $V_{REF}$. The comparators are set to only operate for negative voltages, such as from the time period t2 to t3, and the computer is programmed to first receive a rising pulse before being interrupted on a falling pulse such as between time periods t2 and t3. When the eddy current distortion of all the sensor coils is less than the preset value $V_{REF}$, the computer will be interrupted. This is only done for the Z source coil. This decay time is stored in the computer. The computer then turns on the X source coil and closes the measure switches $M_X'$, $M_Y'$ and $M_Z'$ and the detector switches $D_X'$, $D_Y'$ and $D_Z'$. The measure switches are opened when the generated pulse has reached its peak. The detector switches are opened when the generated pulse has reached zero. The computer 11' controls the reading of all the integrators and then resets all of the reset switches. The computer controls the generation of the pulse from the Y source coil 19' so that the peak of the generated pulse will happen at half the decay time. When the pulse is generated on the Y source coil 19', the cycle is repeated. The computer controls the generation of the pulse from the Y source coil 19' so that the peak of the generated pulse will happen at half the decay time. When the pulse is generated on the Z source coil 21', the cycle is repeated again. After the pulse on the Z source coil 21' has ended and, measurements have been taken, the comparator has interrupted the computer and the integrators have been reset, then a pulse is generated on the X source coil to start a whole new cycle.

If the eddy current distortion is approximated to a straight line, no eddy current distortion will happen during the next source coil pulse relating to the prior activated source coil's pulse.

If the eddy current distortion is not approximated to a straight line, some eddy current distortion will occur caused by the prior source coil activation during the current source coil activation. Calculations for this eddy current distortion can easily be found from the above discussion and are used to compensate the measured signals.

The measured signal on the metal detectors and eddy current distortion decay time are used to calculate the eddy current distortion. The metal detectors measure a signal proportional to only the eddy current decay generated from the rising edge of the signal. Since the integration of the whole pulse will cancel out the eddy current distortion generated during the rise time against the eddy current distortion during the fall time, only the decay of the eddy current distortion generated from the rise time will be included. If the generated pulse is a perfect triangle (rise edge is equal to the falling edge) and the eddy current distortion is simplified to be a straight line, the compensation will then be:

$$V_{EDDY} = \int_{t1}^{t2} \frac{dB_{EDDY}}{dt} dt \cdot \frac{\text{decay time}}{t2-t1} = \int_{t0}^{t1} \frac{dB_{EDDY}}{dt} dt$$

If the generated pulse is not a perfect triangle and if the eddy current distortion is not a straight line, but approximated by an exponential curve, other compensation formulas must be used, as explained hereinabove. Other equations approximating the eddy current distortion can be used. Empirical measurements of the proportionality factor can also be made as described for the second embodiment.

The following measurements are made:

1) V1 integration of the rise time (t3–t4) of the generated magnetic field, includes eddy current component.

$$V1 = \int_{t3}^{t4} \left( \frac{dB}{dt} + \frac{dB_{EDDY}}{dt} \right) dt$$

2) V2 integration of the rise time (t6–t7) of the generated magnetic field, includes eddy current component.

$$V2 = \int_{t6}^{t7} \left( \frac{dB}{dt} + \frac{dB_{EDDY}}{dt} \right) dt$$

3) V3 integration of the rise time (t0–t1) of the generated magnetic field, includes eddy current component.

$$V3 = \int_{t0}^{t1} \left( \frac{dB}{dt} + \frac{dB_{EDDY}}{dt} \right) dt$$

4) V11 integration of the whole pulse (t3–t5) of generated magnetic field; only includes part of the rise time of the pulse eddy current component, since the contribution from the pulse will be zero for a triangle pulse.

$$V11 = \int_{t3}^{t5} \left( \frac{dB}{dt} + \frac{dB_{EDDY}}{dt} \right) dt = \int_{t4}^{t5} \frac{dB_{EDDY}}{dt} dt$$

5) V22 integration of the whole pulse (t6–t8) of generated magnetic field; only includes part of rise time eddy current component, since the contribution from the pulse will be zero for a triangle pulse.

$$V22 = \int_{t6}^{t5} \left( \frac{dB}{dt} + \frac{dB_{EDDY}}{dt} \right) dt = \int_{t7}^{t8} \frac{dB_{EDDY}}{dt} dt$$

6) V33 integration of the whole pulse (t0–t2) of generated magnetic field; only includes part of rise time eddy current component, since the contribution from the pulse will be zero for triangle pulse.

$$V33 = \int_{t0}^{t2} \left( \frac{dB}{dt} + \frac{dB_{EDDY}}{dt} \right) dt = \int_{t1}^{t2} \frac{dB_{EDDY}}{dt} dt$$

The correct eddy current distortion is found for each activated source coil from the above equations and is subtracted from the signal containing both the generated magnetic field and the eddy current distortion.

The integrator offsets are different for this embodiment as compared to that of FIGS. 4 and 5 since the integrators are on for much shorter time periods. No compensation is necessary when the two time intervals (for X source coil, t1-t0≈t2-t0) are almost of the same length for the different source coil excitation. The simple subtraction of the two signals compensates directly.

These corrected values are used to calculate the position and orientation of the remote unit 15' using an algorithm such as described in the Blood patents. This data is outputted to the host computer 12'.

Figure 13:
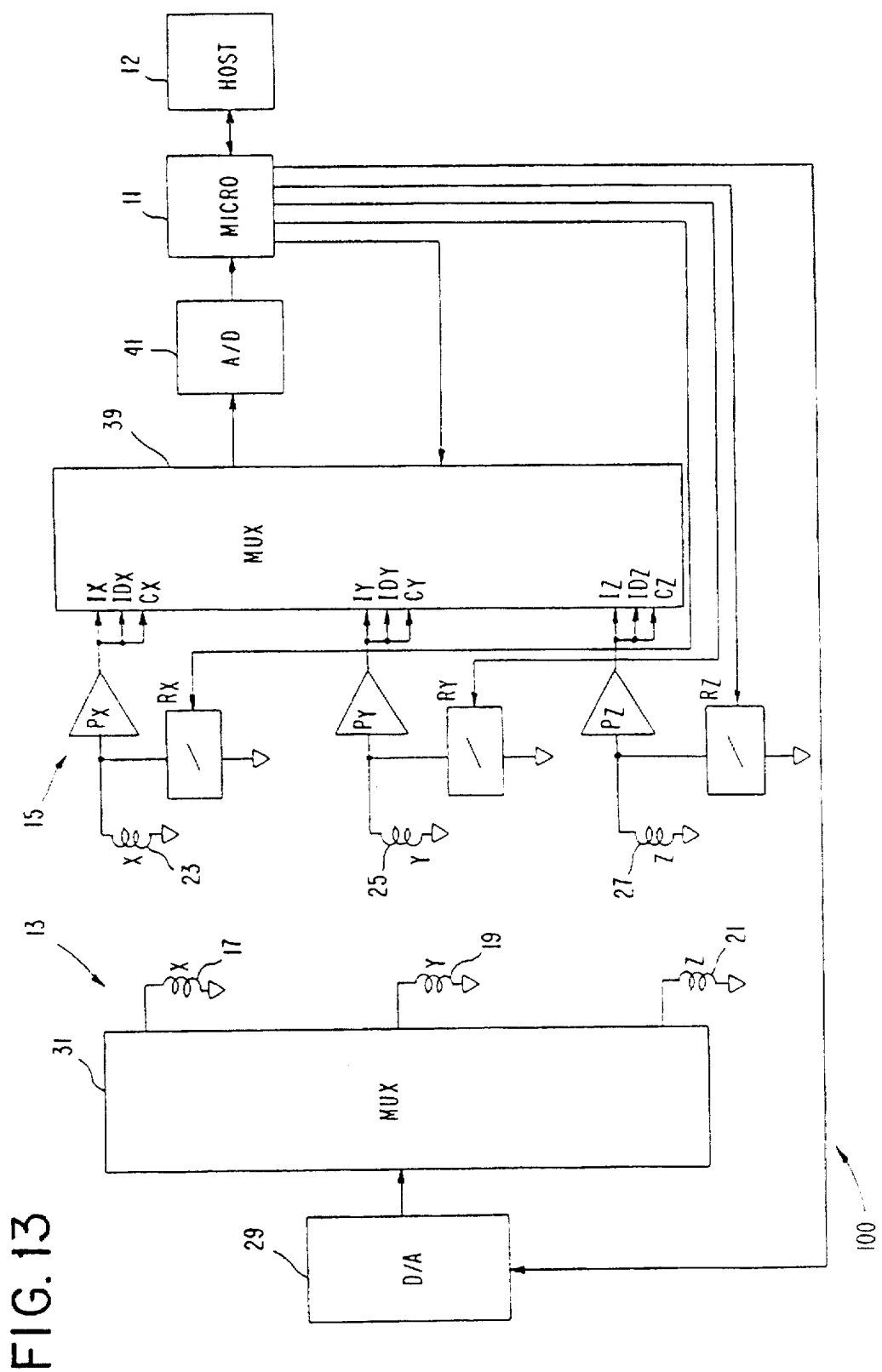
FIG. 13 shows a block diagram of the software implementation of the inventive embodiments.

FIG. 13 shows a block diagram of electrical circuitry representative of the six embodiments of the present invention as described above to facilitate explanation of the software implementation thereof. In FIG. 13, reference numerals and reference letters are employed corresponding to those illustrated in FIG. 1. The system depicted in FIG. 13 is generally designated by the reference numeral 100.

As should be understood from review of FIG. 13, the computer performs measurement integrations by sampling the ports $I_X$, $I_Y$ and $I_Z$ and integrating these sampled values for the required time periods. The computer also performs the comparator function by simply sampling the ports $C_X$, $C_Y$ and $C_Z$ and comparing these sampled values to a preset value as explained above with reference to FIGS. 1–12. The computer is appropriately interrupted as explained above.

The computer further performs metal detector integrations, if needed, or if included in a particular embodiment, by sampling the ports $ID_X$, $ID_Y$ and $ID_Z$ and integrating these sampled values for the required time periods.

In the case of the embodiment illustrated in FIGS. 9 and 10, the ports $I_X''$, $I_Y''$ and $I_Z''$ are used for sampling the values at the required times for measurement determination. The ports $C_X''$, $C_Y''$ and $C_Z''$ are employed in the same manner explained hereinabove. The ports $ID_X$, $ID_Y$ and $ID_Z$ are used for sampling the values at the required times for eddy current distortion determination.

The embodiments set forth hereinabove describe the use of various wave forms of various shapes such as half-sinousoidal, square wave, triangular wave or any other shaped wave form pulse. Based upon the teachings set forth hereinabove, it is believed that one skilled in the art could employ any desired wave form and provide the appropriate calculations.

While the present invention is disclosed in terms of the use of magnetic fields, if desired, other sources such as sources of light, acoustic energy, electric or electromagnetic fields could be employed. While other energy sources would require other manners of compensation for the existence of adjacent metals or other impediments, based upon the teachings of the present invention, it is believed that such compensations are possible.

Instead of the passive coil sensors, if desired, magnetometer sensors or magneto-resistive sensors, Hall effect devices, and any other magnetic field sensitive devices capable of measuring the rate-of-change of a magnetic field could be employed instead of the passive sensor coils disclosed.

The embodiments disclosed herein all teach use of three mutually orthogonal magnetic field sources and three mutually orthogonal passive sensors. As explained hereinabove, the present invention does not reside in aspects of calculations of position and orientation per se, but rather, renders such calculations more accurate by providing embodiments of apparatus and method for compensating for the existence of eddy current-caused distortions in propagated fields. Applicant has referred to U.S. Pat. Nos. 4,849,692 and 4,945,305 to Blood as providing examples of preferred manners of calculating position and orientation of objects from signals generated by receipt of changing magnetic fields by passive sensors. Accordingly, the disclosure of mutually orthogonal magnetic field sources and passive sensors should be considered merely exemplary and the compensation schemes disclosed herein are equally applicable to other arrangements of sources and sensors including that of a single source and a single sensor.

Concerning those embodiments where a steady state component of the signal is employed, it should be apparent that the rising and falling aspects of the pulses could have any desired slope. Concerning those embodiments where no steady state component exists, any desired slopes could be employed for the rising and falling aspects thereof so long as they are substantially symmetrical. If they are not symmetrical, based upon the teachings of the present invention as set forth hereinabove, compensations can be devised for different slopes or curves.

Based upon the teachings of the present invention, it is believed that one skilled in the art may now:

(1) measure the decay time of eddy current distortion and, responsive thereto, dynamically adjust the lengths of source pulses or adjust the time spacing between successive source pulses;

(2) measure eddy current with a metal detector and subtract the eddy current value from signals that contain both a generated magnetic field and a value related to eddy current distortion;

(3) utilize pulses of magnetic field energy having a very short steady state component;

(4) utilize pulses of magnetic field with no steady state component;

(5) generate a magnetic field from the next successive source coil before the eddy current distortion has died out from the prior actuated source coils generation of a magnetic field;

(6) operate at much farther distances using the same source energy as prior art systems;

(7) operate at much faster update rates, with full eddy current distortion compensation, than prior art systems;

(8) operate with much better signal-to-noise ratio, due to rejection of outside electronic noise sources, than prior art systems; and (9) measure and tell the user what kind of metallic items are present in the environment.

Accordingly, an invention has been disclosed in terms of preferred embodiments thereof which fulfill each and every one of the objects of the present invention and provide a new and useful magnetic field position and orientation measurement system with dynamic eddy current rejection of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

We claim:

1. A position and orientation measurement system operating in a space and including a fixed source of successive magnetic field pulses and a magnetic sensor movable within said space and adapted to sense rate-of-change of a magnetic field generated by each of said pulses, and including:

a) eddy current distortion detection means for sensing when a magnetic field generated by eddy currents has dissipated and, responsive to said sensing, stopping transmission of each of said magnetic field pulses, eddy current distortion being caused by eddy currents generated due to presence of metallic material adjacent to and/or in said space;

b) compensation means for dynamically compensating for eddy current distortion including integration means for integrating a signal received from said magnetic sensor from a start of each said magnetic field pulse and reading means for reading an output of said integration means just after said eddy current distortion detection means has sensed dissipation of an eddy current; and c) computer means for controlling receiving of signals, free of eddy current distortion, from said magnetic sensors and, therefrom, calculating position and orientation of said sensor relative to said fixed source.

2. The system of claim 1, wherein integrated signals are proportional to said magnetic field, said integrator means supplying said integrated signals to a computer means.

3. The system of claim 2, further including an amplifier interposed between said magnetic sensor and said integration means.

4. The system of claim 2, further including a comparator connected between said magnetic sensor and said computer means, said comparator comparing voltage output of said sensor with a reference voltage and emitting a comparator signal to said computer means when said sensor voltage output reduces below said reference voltage.

5. The system of claim 4, wherein said sensor voltage output includes a component related to said eddy current distortion, said reference voltage being set at a level whereby when said sensor voltage output drops below said reference voltage, said component has substantially dissipated.

6. The system of claim 5, further wherein said computer means has a comparator signal port receiving said comparator signal, said comparator signal terminating when said sensor voltage output drops below said reference voltage, said computer means, in response to termination of said comparator signal, stopping emission of said magnetic field.

7. The system of claim 6, wherein said magnetic field includes a time component of rising energy followed by a time component of steady state energy followed by a time component of falling energy, stopping of said magnetic field operatively shortening said steady state energy time component.

8. The system of claim 1, wherein said source of magnetic field comprises three mutually orthogonal sources, said magnetic sensor comprises a first passive coil, and further including second and third passive coils, said coils being mutually orthogonal and mounted on a movable remote unit.

9. The system of claim 8, wherein said computer means, responsive to said sensing, adjusts duration of each said magnetic field.

10. The system of claim 8, wherein said sources are sequentially pulsed, said computer means, responsive to said sensing, adjusting time spacing between successive pulses.

11. The system of claim 1, wherein said compensation means includes means for compensating for electronic and rotation offsets.

12. A position and orientation measurement system operating in a space and including a fixed source of successive magnetic field pulses and a magnetic sensor movable within said space and adapted to sense rate-of-change of a magnetic field generated by each of said pulses, said magnetic field having a time component of rising energy followed by a time component of falling energy, said system comprising:

a) eddy current distortion detection means for sensing when a magnetic field generated by said eddy currents has dissipated and, responsive to said sensing, controlling a time between successive ones of said magnetic field pulses, said eddy currents being generated due to presence of metallic material adjacent to and/or in said space;

b) compensation means for dynamically compensating for eddy current distortion generated responsive to activation of said source of successive magnetic field pulses, including means for performing a first integration of a signal from said magnetic sensor from a start of a said magnetic pulse and reading a first output of said first integration when said magnetic pulse has reached its maximum value and performing a second parallel integration of said signal from said magnetic sensor from the start of said magnetic pulse and reading a second output of said second integration, when said magnetic pulse has ended; and c) computer means for controlling receiving of said two outputs and subtracting said second output from said first output and thereby forming a net signal, free of eddy field distortion and, therefrom, calculating position and orientation of said sensor relative to said fixed source.

13. The system of claim 12, further including an integrator connected to receive and integrate signals received from said magnetic sensor, said integrated signals being proportional to said magnetic field generated from said fixed source of magnetic pulses and/or the eddy current distortion, said integrator supplying said integrated signals to said computer means.

14. The system of claim 13, further including a comparator connected between said magnetic sensor and said computer means, said comparator comparing voltage output of said sensor with a reference voltage and emitting a comparator signal to said computer means when said sensor voltage output goes below said reference voltage.

15. The system of claim 14, wherein said sensor voltage output includes a component related to said eddy current distortion, said reference voltage being set at a level whereby when said sensor voltage output drops below said reference voltage, said component has substantially dissipated.

16. The system of claim 15, further wherein said computer means has a comparator signal port receiving said comparator signal, said comparator signal terminating when said sensor voltage output drops below said reference voltage, said computer means, in response to termination of said comparator signal, stopping emission of said magnetic field.

17. The system of claim 12, wherein said source of magnetic field pulses comprises three mutually orthogonal sources, said magnetic sensor comprises a first passive coil, and further including second and third passive coils, said passive coils being mutually orthogonal and mounted on a movable unit.

18. A method of determining the position and orientation of a magnetic sensor within a space including the steps of:

a) positioning said sensor within said space;

b) emitting successive magnetic field pulses within said space;

c) receiving signals from said sensor related to (i) rate-of-change of a magnetic field generated by each of said pulses, and (ii) eddy current distortion generated due to presence of metallic material adjacent to and/or in said space;

d) detecting when the magnetic field due to said eddy currents has dissipated and, responsive to said detection, stopping transmission of each of said magnetic field pulses;

e) dynamically compensating for said eddy current distortion by integrating a signal from said magnetic sensor from a start of each of said pulses and reading output of said integration just after said eddy current has dissipated; and f) controlling receiving of said signals, free of eddy field distortion, from said magnetic sensors and, therefrom, calculating position and orientation of said sensor relative to said fixed source.

19. The method of claim 18, further including the step of comparing said signals with a reference signal and stopping emission of each of said magnetic field pulses when amplitude of said signals falls below amplitude of said reference signal.

20. The method of claim 19, further including the step of detecting existence of metals in and/or adjacent said space when said amplitude of said signals falls below said amplitude of said reference signal.

21. A position and orientation measurement system operating in a space and including a fixed source of successive magnetic field pulses and a magnetic sensor movable within said space and adapted to sense rate-of-change of a magnetic field generated by each of said magnetic field pulses, each of said magnetic field pulses having a time component of rising energy followed by a brief time component of steady state energy followed by a time component of falling energy including:

a) eddy current distortion detection means for sensing when a magnetic field generated by said eddy currents has dissipated and, responsive to said sensing, controlling time spacing between successive ones of said magnetic field pulses, said eddy currents being generated due to presence of metallic material adjacent to and/or in said space;

b) compensation means for dynamically compensating for eddy current distortion including means for performing a first integration of a signal received from said magnetic sensor from a start of each of said pulses and reading a first output of said first integration at a start of said time component of steady state energy and means for performing a second parallel integration of said signal from said magnetic sensor from a start of the time component of steady state energy and reading a second output of said second integration at an end of the time component of steady state energy; and c) computer means for controlling receiving of said first and second outputs, subtracting said second output multiplied by a proportionality factor from said first output and thereby forming a net signal, free of eddy field distortion and, therefrom, calculating position and orientation of said sensor relative to said fixed source.

22. The system of claim 21, further including an integrator connected to receive and integrate signals received from said magnetic sensor, said integrated signals being proportional to said magnetic field generated from said fixed source of magnetic pulses, said integrator supplying said integrated signals to said computer means.

23. The system of claim 22, further including a comparator connected between said magnetic sensor and said computer means, said comparator comparing voltage output of said sensor with a reference voltage and emitting a comparator signal to said computer means when said sensor voltage output goes below said reference voltage.

24. The system of claim 23, wherein said voltage output includes a component related to said eddy current distortion, said reference voltage being set at a level whereby when said sensor voltage output drops below said reference voltage, said component has substantially dissipated.

25. The system of claim 24, further wherein said computer means has a comparator signal port receiving said comparator signal, said comparator signal terminating when said sensor voltage output drops below said reference voltage, said computer means, in response to termination of said comparator signal, adjusting spacing of emission of said magnetic field pulses.

26. The system of claim 25, wherein said computer means, responsive to said sensing, adjusts duration time between each of said magnetic field pulses.

27. The system of claim 26, wherein said source comprises a plurality of sources of magnetic field pulses, said sources being sequentially pulsed, said computer means, responsive to said sensing, adjusting time spacing between successive pulses.

28. The system of claim 24, further including a metal detector sub-circuit receiving signals from said sensor and integrating them to determine effects of eddy current distortion caused by adjacent metallic material.

29. The system of claim 21, wherein said compensation means includes a memory preprogrammed with equations concerning typical eddy current distortion decay curves and said proportionality factor for various metallic materials.

30. The system of claim 21, wherein said compensation means includes a memory preprogrammed with a look-up table listing decay times of eddy currents and said proportionality factor caused by presence of various metallic materials adjacent said space.

31. A position and orientation measurement system operating in a space and including a fixed source of successive magnetic field pulses and a magnetic sensor movable within said space and adapted to sense rate-of-change of a magnetic field generated by each of said pulses, said magnetic field having a time component of rising energy followed by a time component of falling energy including:

a) eddy current distortion detection means sensing when a magnetic field generated by eddy currents has dissipated and, responsive to said sensing, controlling a time interval between successive ones of said magnetic field pulses, said eddy currents being generated due to presence of metallic material adjacent to and/or in said space;

b) compensation means for dynamically compensating for eddy current distortion generated responsive to activation of said source of magnetic field pulses, said compensation means performing a first integration of a signal from said magnetic sensor from a start of each of said magnetic pulses and performing a second integration of an output of said first integration from the start of each of said magnetic pulses and reading an output of said second integration when said eddy current distortion detection means detects that eddy current distortion has dissipated; and c) computer means for controlling receiving of signals free of eddy field distortion and, therefrom, calculating the position and orientation of said sensor relative to said fixed source.

32. The system of claim 31, further including an integrator connected to receive and integrate signals received from said magnetic sensor, integrated signals being proportional to said magnetic field generated from said fixed source of magnetic field pulses and/or said eddy current distortion, said integrator supplying said integrated signals to said computer means.

33. The system of claim 32, further including a comparator connected between said magnetic sensor and said computer means, said comparator comparing voltage output of said sensor with a reference voltage and emitting a comparator signal to said computer means when said sensor voltage output goes below said reference voltage.

34. The system of claim 33, wherein said sensor voltage output includes a component related to said eddy current distortion, said reference voltage being set at a level whereby when said sensor voltage output drops below said reference voltage, said component has substantially dissipated.

35. The system of claim 34, further wherein said computer means has a comparator signal port receiving said comparator signal, said comparator signal terminating when said sensor voltage output drops below said reference voltage, said computer means, in response to termination of said comparator signal, stopping emission of said magnetic field pulses.

36. The system of claim 31, wherein said source of magnetic field pulses comprises three mutually orthogonal sources, said magnetic sensor comprises a first passive coil, and further including second and third passive coils, said coils being mutually orthogonal and mounted on a movable unit.

37. The system of claim 31, further wherein said compensation means includes a first integrator for performing said first integration, said system further including a second integrator that receives integrated signals from said first integrator and integrates said integrated signals and supplies doubly integrated signals to said computer means.

38. The system of claim 31, wherein said magnetic field has no steady state component, said doubly integrated signals having no eddy current component.

39. A position and orientation measurement system operating in a space and including a fixed source of successive magnetic field pulses and a magnetic sensor movable within said space and adapted to sense rate-of-change of a magnetic field generated by each of said magnetic field Pulses, said magnetic field having a time component of rising energy followed by a time component of falling energy, said system including:

a) eddy current distortion detection means sensing when magnetic field generated by eddy currents has dissipated and, responsive to said sensing, controlling time between successive ones of said magnetic field pulses, said eddy currents being generated due to presence of metallic material adjacent to and/or in said space;

b) compensation means for dynamically compensating for eddy current distortion generated responsive to said source of magnetic field, said compensation means performing a first sample-and-hold of a signal received from said magnetic sensor just before each respective one of said magnetic field pulses reaches its maximum energy and performing a second sample-and-hold of said signal from said magnetic sensor just after said respective magnetic pulse has started to drop from its maximum energy; and c) computer means for controlling receiving of data resulting from said first and second sampling and holding of said signal and subtracting data from said second sample and hold from data from said first sample and hold signal and thereby forming a net signal, free of eddy field distortion and, therefrom, calculating position and orientation of said sensor relative to said fixed source.

40. The system of claim 39, further including a comparator connected between said magnetic sensor and said computer means, said comparator comparing voltage output of said sensor with a reference voltage and emitting a comparator signal to said computer means when said sensor voltage output goes below said reference voltage.

41. The system of claim 40, wherein said sensor voltage output includes a component related to said eddy current distortion, said reference voltage being set at a level whereby when said sensor voltage output drops below said reference voltage, said component has substantially dissipated.

42. The system of claim 41, further wherein said computer means has a comparator signal port receiving said comparator signal, said comparator signal terminating when said sensor voltage output drops below said reference voltage, said computer means, in response to termination of said comparator signal, stopping emission of said magnetic field pulses.

43. The system of claim 39, wherein said magnetic sensor signals are also supplied to a magnetic sensor sample-and-hold sub-circuit that measures a time derivative of said sensor signals and outputs a sensor time derivative signal to said computer means.

44. The system of claim 43, further including a metal detector sample-and-hold sub-circuit that receives said sensor signals and measures time derivative of a portion of the sensor signals related solely to eddy current distortion.

45. A position and orientation measurement system operating in a space and including a fixed source of successive magnetic field pulses and a magnetic sensor movable within said space and adapted to sense rate-of-change of a magnetic field generated by each of said magnetic field pulses, said magnetic field having a time component of rising energy followed by a time component of falling energy, said system comprising:

a) eddy current distortion detection means for sensing when a magnetic field generated by said eddy currents has dissipated and, responsive to said sensing, controlling a time interval between successive ones of said magnetic field pulses, said time interval occurring before said eddy current has fully dissipated;

b) compensation means for dynamically compensating for eddy current distortion generated responsive to said source of magnetic field, said compensation means performing a first integration of a signal from said magnetic sensor from a start of each of said magnetic field pulses and said compensation means reading an output of said first integration when said magnetic pulse has reached its maximum value and performing a second parallel integration of said signal from said magnetic sensor from the start of said magnetic pulse and reading an output of said second integration, when said magnetic pulse has concluded; and c) computer means for controlling receiving of said two outputs and subtracting said second output from said first output and thereby forming a net signal, free of eddy field distortion and, therefrom, calculating position and orientation of said sensor relative to said fixed source.

46. A method of determining the position and orientation of a magnetic sensor within a space including the steps of:

a) positioning said sensor within said space;

b) emitting successive magnetic field pulses having a time component of rising energy followed by a brief time component of steady state energy followed by a time component of falling energy;

c) receiving signals from said sensor related to (i) rate-of-change of a magnetic field generated by each of said magnetic field pulses, and (ii) eddy current distortion generated due to presence of metallic material adjacent to and/or in said space;

d) detecting when a magnetic field generated by said eddy current has dissipated and, responsive to said detection, stopping transmission of each of said magnetic field pulses;

e) compensating dynamically for eddy current distortion generated responsive to operation of said source of said magnetic field pulses, including the step of performing a first integration of a signal from said magnetic sensor from a start of each successive one of said magnetic pulses and reading a first output of said first integration at a start of the steady state and performing a second integration of said signal from said magnetic sensor from a start of steady state and reading a second output of said integration at an end of the steady state;

f) controlling receiving of said outputs resulting from said integrations, subtracting said second output multiplied by a proportionality factor from said first output and thereby forming a net signal, free of eddy field distortion and, therefrom, calculating position and orientation of said sensor relative to said fixed source.

47. A method of determining the position and orientation of a magnetic sensor within a space including the steps of:

a) positioning said sensor within said space;

b) emitting successive magnetic field pulses having a time component of rising energy followed by a time component of falling energy, within said space;

c) receiving signals from said sensor related to (i) rate-of-change of a magnetic field generated by successive ones of said magnetic field pulses, and (ii) eddy current distortion generated due to presence of metallic material adjacent to and/or in said space;

d) detecting when a magnetic field portion generated by eddy currents has dissipated and, responsive to said detection, stopping transmission of each of said magnetic field pulses;

e) dynamically compensating for eddy current distortion generated responsive to operation of said source of magnetic field pulses, by performing a first integration of a signal from said magnetic sensor from a start of each of said magnetic field pulses and reading a first output of said first integration when each of said magnetic field pulses has reached its maximum value and performing a second integration of said signal from said magnetic sensor from a start of each of said magnetic field pulses and reading a second output of said second integration, when said magnetic pulse has concluded;

f) controlling receiving of said two outputs and subtracting said second output from said first output and thereby forming a signal, free of eddy field distortion and, therefrom, calculating position and orientation of said sensor relative to said fixed source.

48. A method of determining the position and orientation of a magnetic sensor within a space including the steps of:

a) positioning said sensor within said space;

b) emitting successive magnetic field pulses each having a time component of rising energy followed by a time component of falling energy, within said space;

c) receiving signals from said sensor related to (i) rate-of-change of a magnetic field generated by each of said magnetic field pulses, and (ii) eddy current distortion generated due to presence of metallic material adjacent to and/or in said space;

d) detecting when a magnetic field generated by said eddy current has dissipated and, responsive to said detection, stopping transmission of each of said magnetic field pulses;

e) dynamically compensating for eddy current distortion generated responsive to said source of magnetic field, by performing a first integration of a signal from said magnetic sensor from a start of each of said magnetic field pulses and reading a first output, and performing a second integration of said first output of said first integration from said start of each of said magnetic field pulses and reading a second output of said second integration when said eddy current distortion has dissipated;

f) controlling receiving of said second output, free of eddy field distortion and, therefrom, calculating position and orientation of said sensor relative to said fixed source.

49. A method of determining the position and orientation of a magnetic sensor within a space including the steps of:

a) positioning said sensor within said space;

b) emitting successive magnetic field pulses each having a time component of rising energy followed by a time component of falling energy, within said space;

c) receiving signals from said sensor related to (i) rate-of-change of each of said magnetic field pulses, and (ii) eddy current distortion generated due to presence of metallic material adjacent to and/or in said space;

d) detecting when a magnetic field generated by said eddy current has dissipated and, responsive to said detection, stopping transmission of each of said magnetic field pulses;

e) dynamically compensating for said eddy current distortion generated responsive to said source of magnetic field pulses, by performing a first sample-and-hold of a signal from said magnetic sensor just before a magnetic field pulse reaches its maximum energy and performing a second sample-and-hold of said signal just after said magnetic field pulse has started to drop from its maximum energy;

f) controlling receiving of said data resulting from said first and second sampling and holding of said signal and subtracting said data from said second sample-and-hold from data from said first sample-and-hold and thereby forming a net signal, free of eddy field distortion and, therefrom, calculating position and orientation of said sensor relative to said fixed source.

50. A method of determining the position and orientation of a magnetic sensor within a space including the steps of:

a) positioning said sensor within said space;

b) emitting successive magnetic field pulses having a time component of rising energy followed by a time component of falling energy, within said space;

c) receiving signals from said sensor related to (i) rate-of-change of a magnetic field generated by each of said magnetic field pulses, and (ii) eddy current distortion generated due to presence of metallic material adjacent to and/or in said space;

d) sensing when a magnetic field generated by eddy current has dissipated and, responsive to said sensing, controlling a time interval between successive ones of said magnetic field pulses, said time interval being before said eddy current has fully dissipated;

e) dynamically compensating for eddy current distortion generated responsive to said source of magnetic field pulses, by performing a first integration of a signal from said magnetic sensor from a start of a said magnetic field pulse and reading a first output of said first integration when said magnetic field pulse has reached its maximum value and performing a second integration of said signal from said magnetic sensor from a start of said magnetic field pulse and reading a second output of said second integration, when said magnetic field pulse has concluded;

f) controlling receiving of said outputs and subtracting said second output from said first output and thereby forming a net signal, free of eddy field distortion and, therefrom, calculating position and orientation of said sensor relative to said fixed source.

* * * * *